United States Patent [19]
Ohto et al.

[11] Patent Number: 5,319,294
[45] Date of Patent: Jun. 7, 1994

[54] APPARATUS FOR AUTOMATICALLY ADJUSTING OFFSET CORRECTION VALUES FOR CURRENT DETECTORS

[75] Inventors: Masahiro Ohto, Hirakata; Hisashi Kinoshita, Katano; Nin Kake, Ikoma; Yoshihiro Ino, Kawanishi, all of Japan

[73] Assignee: Matsushita Electric Industrial Co., Ltd., Osaka, Japan

[21] Appl. No.: 65,232

[22] Filed: May 24, 1993

[30] Foreign Application Priority Data

| May 28, 1992 | [JP] | Japan | 4-135488 |
| Sep. 7, 1992 | [JP] | Japan | 4-237518 |
| Oct. 1, 1992 | [JP] | Japan | 4-263293 |
| Oct. 1, 1992 | [JP] | Japan | 4-263296 |

[51] Int. Cl.$^5$ .......................... G05B 19/405
[52] U.S. Cl. .................. 318/568.22; 318/632; 318/650
[58] Field of Search ........... 318/560, 561, 563, 568.22, 318/569-572, 599-603, 629, 632-633, 634, 650, 652-653, 568.1, 568.11-568.19, 611, 615-618; 388/902

[56] References Cited

U.S. PATENT DOCUMENTS

| 4,352,050 | 8/1982 | Sakano | 318/632 X |
| 4,494,060 | 1/1985 | Chitayat et al. | 318/632 X |
| 4,792,739 | 12/1988 | Nakamura et al. | 318/632 X |
| 4,795,954 | 1/1989 | Sakurai et al. | 318/661 |
| 4,874,997 | 10/1989 | Daggett et al. | 318/568.22 |
| 4,902,951 | 2/1990 | Ohta et al. | 318/632 |
| 4,967,128 | 10/1990 | Sawai et al. | 318/609 |
| 5,157,317 | 10/1992 | Coby | 318/632 |
| 5,200,682 | 4/1993 | Kim et al. | 318/632 |
| 5,220,261 | 6/1993 | Kempas | 318/568.22 X |

FOREIGN PATENT DOCUMENTS

| 27112 | 1/1990 | Japan . |
| 2141673 | 5/1990 | Japan . |

Primary Examiner—William M. Shoop, Jr.
Assistant Examiner—David Martin
Attorney, Agent, or Firm—Stevens, Davis, Miller & Mosher

[57] ABSTRACT

An automatic offset adjusting apparatus for current detectors in a digital controller for a servo motor is constructed so that, when errors occur in offset correction values due to a temperature change and the like while the servo motor is in operation, an electrical angle detecting unit detects a ripple of the torque of the servo motor, on the basis of a ripple of a torque command value, and detects a first electrical angle, where the torque command value becomes maximum, and a second electrical angle, where the torque command value becomes minimum, based on an electrical angle signal of the servo motor, a judgement unit judges whether or not offset correction errors have occurred on the basis of a difference between the first and second electrical angles, and, if the judgement unit judges that the offset correction errors have occurred, a correction unit adds adjustment values for the offset correction values corresponding to the first electrical angle to the respective offset correction values to update the offset correction values, whereby the correction of the offset correction values is automatically carried out even while the servo motor is in operation, thereby preventing generation of the ripple of the torque of the servo motor.

8 Claims, 12 Drawing Sheets

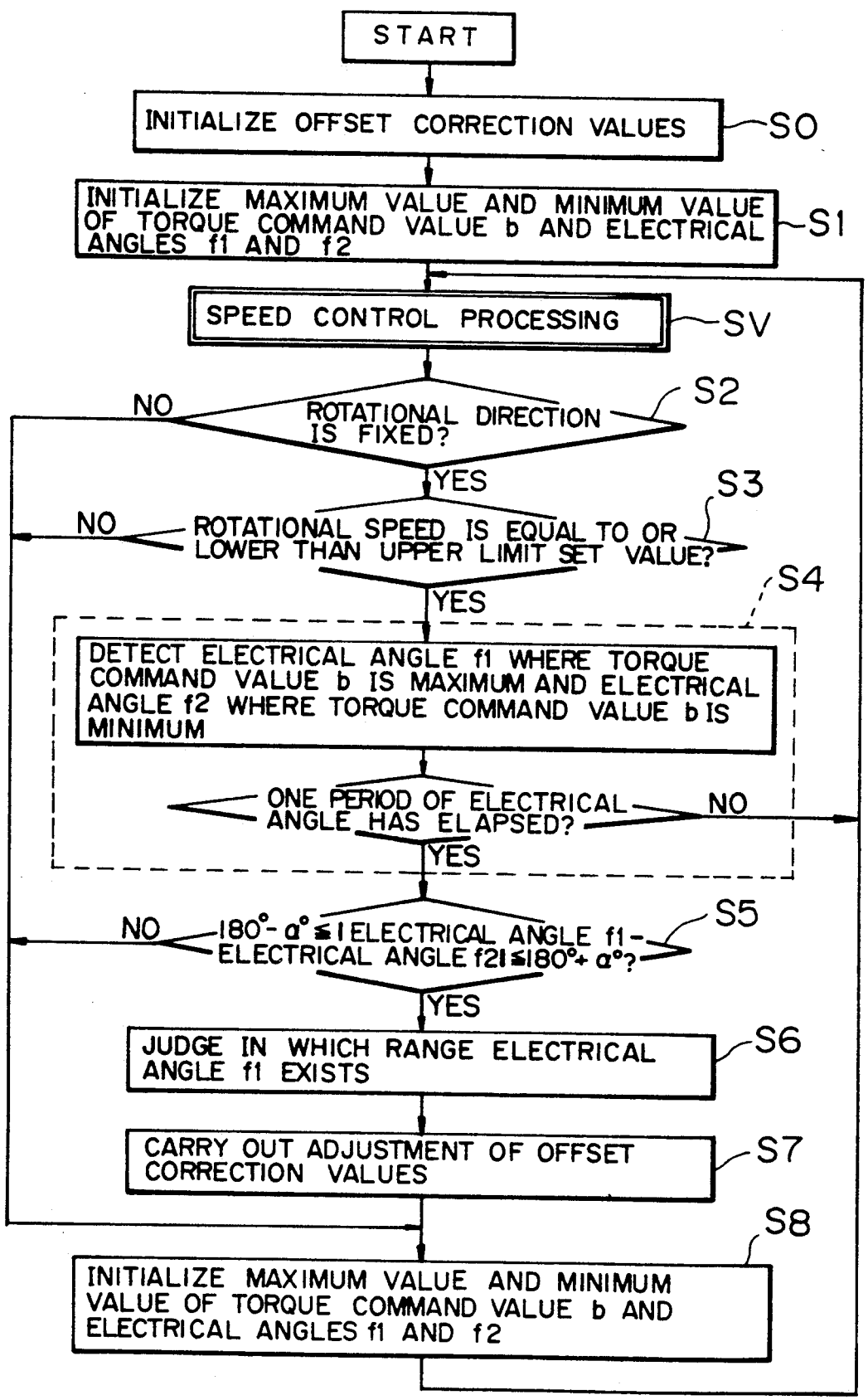

FIG. 4A

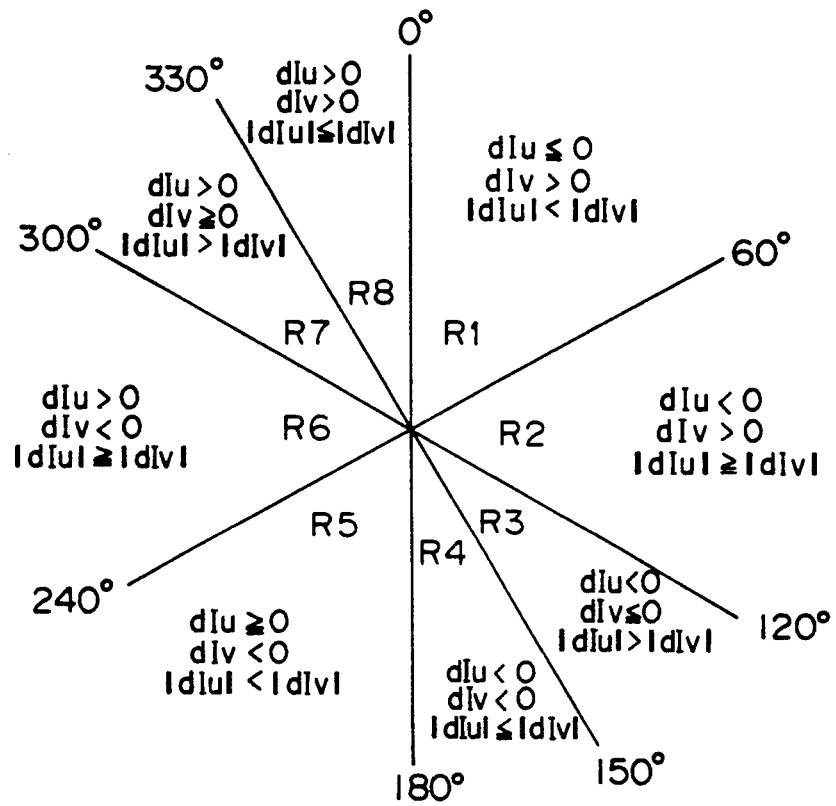

FIG. 4B

| POSITION OF ELECTRICAL ANGLE f1 | ADJUSTMENT VALUE FOR OFFSET CORRECTION VALUES | |
|---|---|---|
| | PHASE U | PHASE V |
| RANGE R1 | INCREASE BY 1 BIT | DECREASE BY 2 BITS |
| RANGE R2 | INCREASE BY 2 BITS | DECREASE BY 1 BIT |
| RANGE R3 | INCREASE BY 2 BITS | INCREASE BY 1 BIT |
| RANGE R4 | INCREASE BY 1 BIT | INCREASE BY 2 BITS |
| RANGE R5 | DECREASE BY 1 BIT | INCREASE BY 2 BITS |
| RANGE R6 | DECREASE BY 2 BITS | INCREASE BY 1 BIT |
| RANGE R7 | DECREASE BY 2 BITS | DECREASE BY 1 BIT |
| RANGE R8 | DECREASE BY 1 BIT | DECREASE BY 2 BITS |

| POSITION OF ELECTRICAL ANGLE f1 | ADJUSTMENT VALUE FOR OFFSET CORRECTION VALUES |
|---|---|
| RANGE R1 | PHASE V : ( DECREASE BY 1 BIT ) |
| RANGE R2 | PHASE U : ( INCREASE BY 1 BIT ) |
| RANGE R3 | PHASE V : ( INCREASE BY 1 BIT ) |
| RANGE R4 | PHASE U : ( DECREASE BY 1 BIT ) |

| POSITION OF ELECTRICAL ANGLE f1 | ADJUSTMENT VALUE FOR OFFSET CORRECTION VALUES | |
|---|---|---|
| | PHASE U | PHASE V |
| RANGE R1 | INCREASE BY Ku BITS | DECREASE BY Kv BITS |
| RANGE R2 | INCREASE BY Ku BITS | INCREASE BY Kv BITS |
| RANGE R3 | DECREASE BY Ku BITS | INCREASE BY Kv BITS |
| RANGE R4 | DECREASE BY Ku BITS | DECREASE BY Kv BITS |

APPARATUS FOR AUTOMATICALLY ADJUSTING OFFSET CORRECTION VALUES FOR CURRENT DETECTORS

BACKGROUND OF THE INVENTION

The present invention relates to an apparatus for automatically adjusting offset correction values for current detectors in a digital controller for a servo motor for use in a high precision NC system, robot, etc.

Heretofore, in a digital control apparatus for a servo motor for use in a high precision NC system, robot, etc., in the case where a current detector composed of an analog circuit is used as current detecting means, correction of an offset of an output of the current detector is carried out. That is, when turning on a power source, an output voltage of the current detector, which is detected while the servo motor is stopped, is set as an offset correction value, and the offset correction value which has been set upon turning on the power source is not updated while the motor is in operation.

However, in the above-mentioned prior art apparatus, there arises a problem that, when an error occurs between an actual offset value and the offset correction value, which has been set when turning on the power source, due to a change of an ambient temperature, a temperature rise in component elements of the current detector and the like while operating the servo motor for a long period of time, a ripple having the same period as that of an electrical angle is generated in the torque of the servo motor.

SUMMARY OF THE INVENTION

The present invention was made in order to solve the above-mentioned problem, and an object of the present invention is to provide an apparatus for automatically adjusting offset correction values for current detectors which is capable of judging occurrence of correction errors of offset correction values due to a temperature rise in component elements in the current detectors on the basis of a ripple of the quadratureaxis current value which is obtained by subjecting a ripple of a torque command value for the servo motor or a three phase feedback a.c. value to three phase/two phase conversion, and which is capable of automatically carrying out the correction of the offset correction values even when the servo motor is in operation, thereby preventing generation of the ripple of the torque of the servo motor.

In order to attain the above-mentioned object, a first aspect of the present invention provides an apparatus for automatically adjusting offset correction values for current detectors of a digital controller for a servo motor employing the current detectors, each having an offset value, which comprises: rotation detecting means for receiving both a torque command value and an electrical angle signal of the servo motor as its input and detecting that, in one period of an electrical angle, the servo motor rotates in one direction and its rotational speed is equal to or lower than a predetermined upper limit set value; electrical angle detecting means for detecting, at the time of detection by the rotation detecting means, a first electrical angle where the torque command value is maximum and a second electrical angle where the torque command value is minimum, in one period of an electrical angle, respectively; judgement means for judging whether or not a difference between the first and second electrical angles detected by the electrical angle detecting means is 180 degrees; and correction means for correcting, when the judgement means judges that the difference between the first and second electrical angles is 180 degrees, offset correction values for the current detectors in accordance with the first electrical angle.

Further, in order to attain the abovementioned object, a second aspect of the present invention provides an apparatus for automatically adjusting offset correction values for current detectors of a digital controller for a servo motor employing the current detectors, each having an offset value, which comprises: rotation detecting means for receiving both a three phase feedback a.c. value and an electrical angle signal of the servo motor as its input and detecting that, in one period of an electrical angle, the servo motor rotates in one direction and its rotational speed is equal to or lower than a predetermined upper limit set value; electrical angle detecting means for detecting, at the time of detection by the rotation detecting means, a first electrical angle where a quadrature-axis current obtained from the three phase feedback a.c. value of the servo motor is maximum and a second electrical angle where the quadrature-axis current value is minimum, in the one period of an electrical angle, respectively; judgement means for judging whether or not a difference between the first and second electrical angles detected by the electrical angle detecting means is 180 degrees; and correction means for correcting, when the judgement means judges that the difference between the first and second electrical angles is 180 degrees, offset correction values for the current detectors in accordance with the first electrical angle.

Further in the first or second aspect of the present invention, the correction means for correcting the offset correction values for the current detectors according to a third aspect of the present invention comprises: electrical angle existing range judging means for judging in which one of eight division ranges obtained by dividing an electrical angle of 360 degrees the first electrical angle exists; and offset correction value outputting means having adjustment values for the offset correction values, which are set in accordance with the eight division ranges, and serving to add the adjustment values for the offset correction values corresponding to the division range, in which the first electrical angle exists, to the respective offset correction values to update the offset correction values and output the resultant values.

Further in the first or second aspect of the present invention, the correction means for correcting offset correction values for the current detectors according to a fourth aspect of the present invention comprises: electrical angle existing range judging means for judging in which one of four division ranges obtained by dividing an electrical angle of 360 degrees the first electrical angle exists; and offset correction value outputting means having adjustment values for the offset correction values, which are set in accordance with the four division ranges, and serving to add the adjustment values for the offset correction values corresponding to the division range, in which the first electrical angle exists, to the respective offset correction values to update the offset correction values and output the resultant values.

Further, a fifth aspect of the present invention provides an apparatus for automatically adjusting offset correction values for current detectors of a digital controller for a servo motor employing the current detectors, each having an offset value, which comprises: rotation detecting means for receiving both a torque command value and an electrical angle signal of the servo motor as its input and detecting that, in one period of an electrical angle, the servo motor rotates in one direction and its rotational speed is equal to or lower than a predetermined upper limit set value; torque/electrical angle detecting means for detecting, at the time of detection by the rotation detecting means, a maximum value of the torque command value, a first electrical angle at the time of obtaining the maximum torque command value, a minimum value of the torque command value, and a second electrical angle at the time of obtaining the minimum torque command value, in the one period of the electrical angle, respectively; judgement means for judging whether or not a difference between the first and second electrical angles detected by the torque/electrical angle detecting means is 180 degrees; and correction means for correcting, when the judgement means judges that the difference between the first and second electrical angles is 180 degrees, offset correction values for the current detectors in accordance with the first electrical angle and a difference between the maximum torque command value and the minimum torque command value.

Further in the fifth aspect of the present invention, the correction means for correcting offset correction values for the current detectors according to a sixth aspect of the present invention comprises: electrical angle existing range judging means for judging in which one of four division ranges obtained by dividing an electrical angle of 360 degrees the first electrical angle exists; and offset correction value outputting means having adjustment values for the offset correction values, which are set in accordance with the four division ranges and a difference between the maximum torque command value and the minimum torque command value, and serving to add the adjustment values for the offset correction values corresponding to the division range, in which the first electrical angle exists, and the difference between the maximum torque command value and the minimum torque command value to the respective offset correction values to update the offset correction values and output the resultant values.

By virtue of the first aspect of the present invention, even if correction errors occur in the offset correction values due to a change of an ambient temperature and the like while the servo motor is in operation, the occurrence of the correction errors of the offset correction values due to a temperature rise in the current detectors is judged on the basis of a ripple of the torque command value for the servo motor, and in accordance with the electrical angle where the torque command value becomes maximum in one period of an electrical angle, the offset correction values for the current detectors are corrected, so that, even while the servo motor is in operation, correction of the offset correction values is automatically performed, and therefore it is possible to prevent generation of a ripple of the torque of the servo motor and also to suppress deterioration of control performance such as an increase of a speed ripple.

By virtue of the second aspect of the present invention, even if correction errors occur in the offset correction values due to a change of an ambient temperature and the like while the servo motor is in operation, the occurrence of the correction errors of the offset correction values due to a temperature rise in the current detectors is judged on the basis of a ripple of the quadrature-axis current value which is obtained from a feedback current value for the servo motor, and, in accordance with the electrical angle where the quadrature-axis current value becomes maximum in one period of an electrical angle, the offset correction values for the current detectors are corrected, so that, even while the servo motor is in operation, correction of the offset correction values is automatically performed, and therefore it is possible to prevent generation of a ripple of the torque of the servo motor and also to suppress deterioration of control performance such as an increase of a speed ripple.

By virtue of the fifth aspect of the present invention, even if correction errors occur in the offset correction values due to a change of an ambient temperature and the like while the servo motor is in operation, the occurrence of the correction errors of the offset correction values due to a temperature rise in the current detectors is judged on the basis of a ripple of the torque command value, and, in accordance with the electrical angle, where the torque command value becomes maximum, and a difference between the maximum torque command value and the minimum torque command value, which have been obtained in one period of an electrical angle of the servo motor driving current, respectively, the offset correction values for the current detectors are corrected, so that, even while the servo motor is in operation, correction of the offset correction values is automatically performed, and therefore it is possible to prevent generation of a ripple of the torque of the servo motor and also to suppress deterioration of control performance such as an increase of a speed ripple.

BRIEF DESCRIPTION OF THE DRAWINGS

FIG. 3 is a flow chart showing the processing operation performed in the apparatus for automatically adjusting offset correction values shown in FIG. 2;

FIGS. 4A and 4B are respectively a diagram showing the values of an electrical angle fl, the signs of plus and minus of offset correction errors dIu and dIv and the magnitude relation therebetween in the first and third embodiments of the present invention, and a diagram showing adjustment values for an offset correction value cl of phase U and an offset correction value c2 of phase V in the first and third embodiment of the present invention;

DESCRIPTION OF THE PREFERRED EMBODIMENTS

The preferred embodiments of the present invention will hereinafter be described with reference to the accompanying drawings.

Embodiment 1

Figure 1:
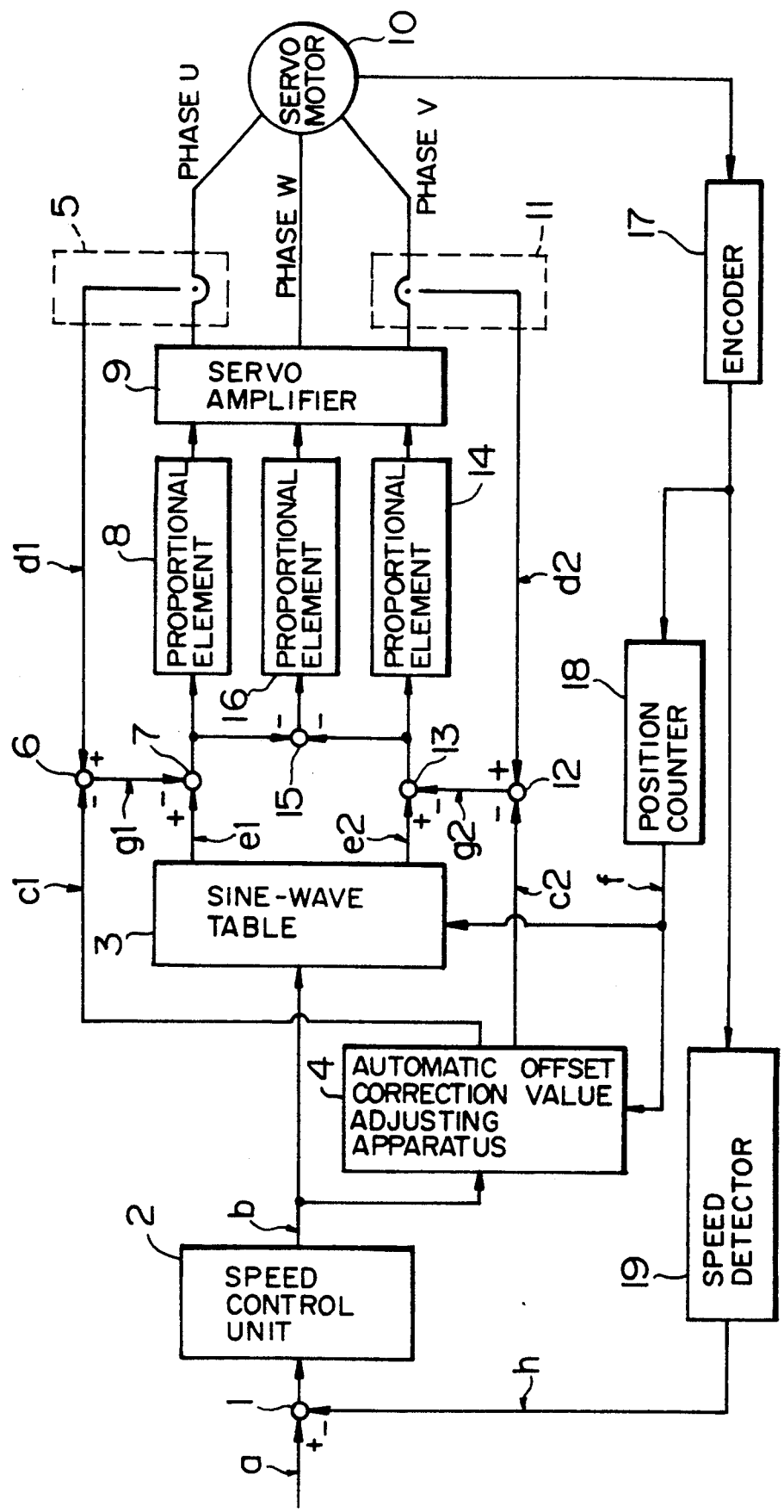
FIG. 1 is a block diagram showing a digital controller for a servo motor having an apparatus for automatically adjusting offset correction values for current detectors of a first embodiment of the present invention.

FIG. 1 is a block diagram showing a digital controller for a servo motor including an apparatus for automatically adjusting offset correction values for current detectors of a first embodiment of the present invention. In the digital controller shown in FIG. 1, an adder 1 to which a speed command value a is input is connected to both a sine-wave table 3 and an apparatus 4 for automatically adjusting offset correction values through a speed control unit 2. Thus, a torque command value b output by the speed control unit 2 is input to both the sine-wave table 3 and the automatic offset correction value adjusting apparatus 4. An output terminal of the automatic offset correction value adjusting apparatus 4 and an output terminal of a current detector 5 of phase U having an offset value are connected to an adder 6, so that an offset correction value c1 of phase U output by the automatic offset correction value adjusting apparatus 4 and a detected current value d1 of phase U having an offset value output by the current detector 5 are input to the adder 6. The adder 6 and the sine-wave table 3 are connected to an adder 7 so that a current command value e1 of phase U output by the sine-wave table 3 and a feedback current value g1 of phase U output by the adder 6 are input to the adder 7. The adder 7 is connected to a servo motor 10 through a proportional element 8 and a servo amplifier 9. The above-mentioned current detector 5 of phase U is provided between the servo amplifier 9 and the servo motor 10. Further, an output terminal of the automatic offset correction value adjusting apparatus 4 and an output terminal of a current detector 11 of phase V having an offset value are connected to an adder 12 so that an offset correction value c2 of phase V output by the automatic offset correction value adjusting apparatus 4 and a detected current value d2 of phase V having an offset value output by the current detector 11 are input to the adder 12. The adder 12 and the sine-wave table 3 are connected to an adder 13 so that a current command value e2 of phase V output by the sine-wave table 3 and a feedback current g2 of phase V output by the adder 12 are input to the adder 13. The adder 13 is connected to the servo motor 10 through a proportional element 14 and the servo amplifier 9. The current detector 11 of phase V is provided between the servo amplifier 9 and the servo motor 10. In addition, the adders 7 and 13 are connected to the servo motor 10 through an adder 15, a proportional element 16 and the servo amplifier 9.

Further, the servo motor 10 is connected to an encoder 17 which is connected to both the automatic offset correction value adjusting apparatus 4 and the sine-wave table 3 through a position counter 18 so that an electrical angle signal f of the servo motor 10 output by the position counter 18 is input to both the automatic offset correction value adjusting apparatus 4 and the sine-wave table 3. Further, the encoder 17 is connected to the adder 1 through a speed detector 19 so that a speed feedback value h output by the speed detector 19 is input to the adder 1.

Figure 2:
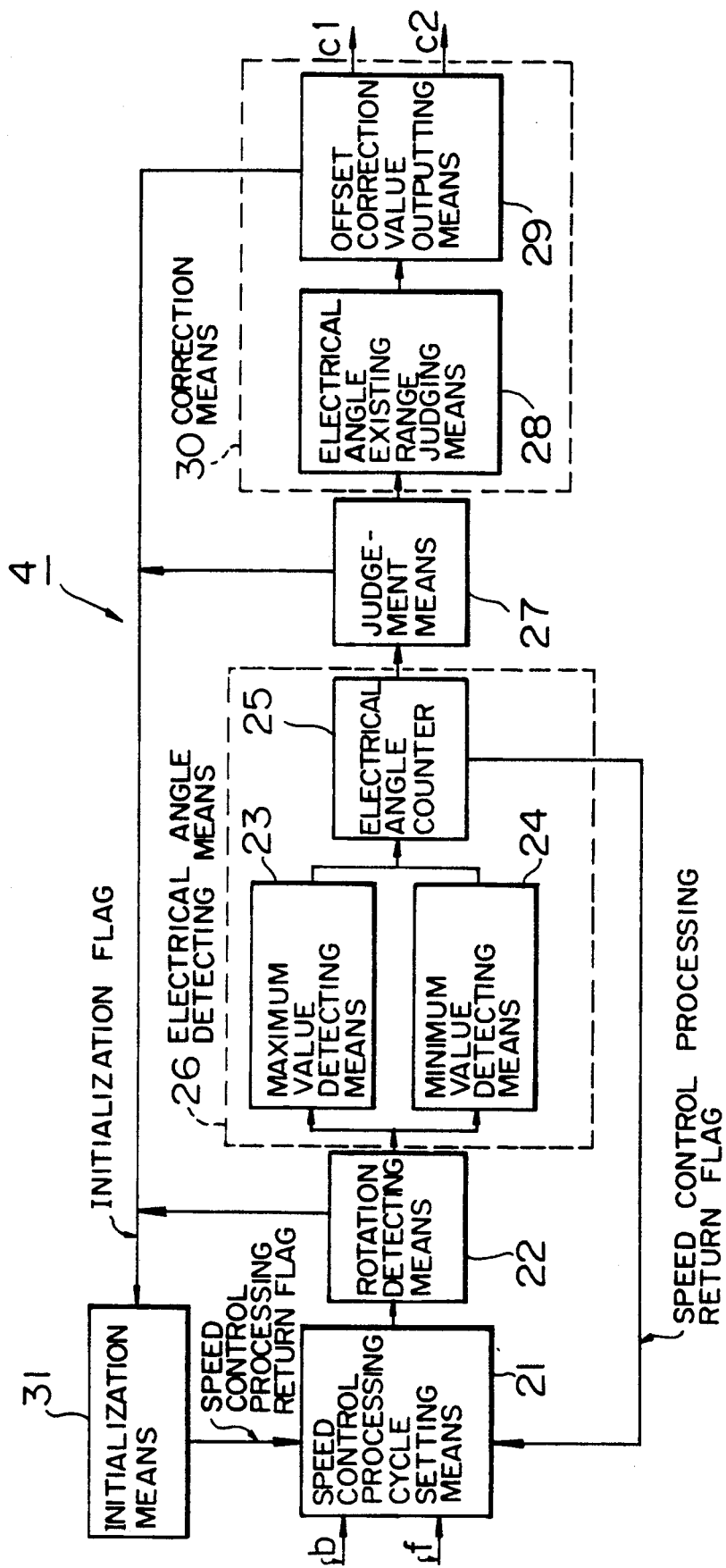
FIG. 2 is a block diagram showing an internal structure of the apparatus for automatically adjusting offset correction values shown in FIG. 1.

FIG. 2 is a block diagram showing an internal structure of the automatic offset correction value adjusting apparatus 4 shown in FIG. 1. In FIG. 2, means 21 for setting a speed control processing cycle receives both a torque command value b and an electrical angle signal f of the servo motor 10 as its input, and passes both the torque command value b and the electrical angle signal f therethrough and also sets a speed control processing cycle on the basis of a speed control processing return flag so that the processing proceeds to a next speed control processing cycle. Means 22 for detecting rotation of the servo motor 10, to which the speed control processing cycle setting means 21 is connected, receives both the torque command value b and the electrical angle signal f as its input and detects that the rotational direction is the same as that in the last speed control processing cycle and the rotational speed is equal to or lower than a predetermined upper limit set value so that a difference in phase between the torque of the servo motor 10 and the torque command value b does not raise a problem. Means 26 for detecting an electrical angle, to which the rotation detecting means 22 is connected, receives both the torque command value b and the electrical angle signal f as its input. The electrical angle detecting means 26 is constituted by means 23 for detecting a maximum value which operates to store an electrical angle as a first electrical angle f1 when the torque command value b is maximum, means 24 for detecting a minimum value which operates to store an electrical angle as a second electrical angle f2 when the torque command value b is minimum, and an electrical angle counter 25 which operates to count an electrical angle signal f and to output a speed control processing return flag to the speed control processing cycle setting means 21, if the lapse of one period of the electrical angle is not detected, and this electrical angle detecting means 26 operates at the time of detection by the rotation detecting means 22. A judgement means 27, to which the electrical angle detecting means 26 is connected, judges whether or not a difference between the first and second electrical angles f1 and f2 detected by the electrical angle detecting means 26 is 180 degrees. Means 28 for judging an electrical angle existing range, to which the judgement means 27 is connected, judges, when the judgement means 27 judges that a difference between the first and second electrical angles f1 and f2 is 180 degrees, in which one of eight division ranges obtained by dividing the electrical angle of 360 degrees the first electrical angle f1 exists. Means 29 for outputting offset correction values, to which the electrical angle existing range judging means 28 is connected, has adjustment values for the offset correction values which were set in accordance with the eight division ranges. With this structure, the offset correction value outputting means 29 operates to add the adjustment values for the offset correction values corresponding to the division ranges, in which the first electrical angle f1 exists, to the offset correction values, respectively, to thereby update the offset correction values and to output the resultant values as offset correction values c1 and c2. The electrical angle existing range judging means 28 and the offset correction value outputting means 29 constitute correction means 30, so that offset correction values for the current detectors 5 and 11 shown in FIG. 1 are corrected in accordance with the first electrical angle f1.

Further, initialization means 31, to which the rotation detecting means 22, the judgement means 27 and the offset correction value outputting means 29 are connected, initializes the maximum value and the minimum value of the torque command value b and the values of the first and second electrical angles f1 and f2 on the basis of an initialization flag output from one of the rotation detecting means 22, the judgement means 27 and the offset correction value outputting means 29, and then outputs a speed control processing return flag to the speed control processing cycle setting means 21. Besides, at the time of performing initialization of the processing cycle, setting of initial values of the offset correction values is also performed in the initialization means 31.

In the automatic offset correction value adjusting apparatus 4 having the structure as described above, if correction errors have occurred in the offset correction values of the current detectors 5, 11, a ripple having the same period as that of the electrical angle is generated in the torque of the servo motor 10, and there exist a first electrical angle f1 where the torque command value b is maximum and a second electrical angle f2 where the torque command value b is minimum. In the present embodiment, automatic adjustment of the offset correction values is performed by detecting the first electrical angle f1.

FIG. 3 is a flow chart showing the processings performed in the automatic offset correction value adjusting apparatus 4 shown in FIG. 2. Among the steps of the processings, Steps S0 and S1 show processing steps of initialization, and a speed control processing step SV and Steps S2 to S8 show processing step which are executed in a normal operation of the servo motor 10. As shown in FIG. 3, firstly in Step S0, according to the above-mentioned prior art, the offset correction values which are determined at the time of turning on a power supply, are set as initial values. Then, in Step S1, the maximum value b1 and the minimum value b2 of the torque command value b and the values of the first and second electrical angles f1 and f2 are initialized by the initialization means 31.

After a normal operation of the servo motor 10 is started and the speed control processing step SV has been executed, in Step S2, the rotation detecting means 22 detects the present rotational direction of the motor shaft and then compares this rotational direction thus detected with the rotational direction in the last speed control processing cycle. If the rotational direction is changed, the processing proceeds to Step 8, where the maximum value and the minimum value of the torque command value b and the values of the first and second electrical angles f1 and f2 are initialized by the initialization means 31, and then the processing proceeds to a next speed control processing cycle. On the other hand, if the present rotational direction is the same as that in the last speed control processing cycle, the processing proceeds to Step S3. In Step S3, the present rotational speed is detected by the rotation detecting means 22. Then, if the present rotational speed thus detected is equal to or higher than a predetermined upper limit set value, in the same manner as that of Step S2, the processing proceeds to Step S8, and the maximum value and the minimum value of the torque command value b and the values of the first and second electrical angles f1 and f2 are initialized by the initialization means 31, and then the processing proceeds to a next speed control processing cycle. On the other hand, if the rotational speed is equal to or lower than the predetermined upper limit set value, the processing proceeds to Step S4. In Step S4, until the time when the electrical angle counter 25 detects the lapse of one period of the electrical angle, the torque command value b and the electrical angle signal f are input to the maximum value detecting means 23 and the minimum value detecting means 24 once at every speed control processing cycle, and the value of the electrical angle signal at the time when the torque command value b measured during one period of the electrical angle becomes maximum is stored as a first electrical angle f1 in the maximum value detecting means 23, and the value of the electrical angle signal at the time when the torque command value b measured during one period of the electrical angle becomes minimum is stored as a second electrical angle f2 in the minimum value detecting means 24. If the lapse of one period of the electrical angle is not detected, the processing proceeds to a next speed control processing cycle. On the other hand, if the lapse of one period of the electrical angle is detected, the processing proceeds to Step S5. In Step S5, based on the fact that a torque ripple of the servo motor 10 due to correction errors of the offset correction values has the same period as that of the electrical angle, if an absolute value of a difference between the first and second electrical angles f1 and f2 is not 180 degrees, it is judged by the judgement means 27 that a torque ripple due to any factor other than correction errors of the offset correction values has been generated. Then, in Step S8, the maximum value and the minimum value of the torque command value b and the values of the first and second electrical angles f1 and f2 are initialized by the initialization means 31, and the processing proceeds to a next speed control processing cycle. On the other hand, if it is decided in Step S5 that the absolute value of a difference between the first and second electrical angles f1 and f2 is 180 degrees, it is judged by the judgement means 27 that a torque ripple due to correction errors of the offset correction values has been generated. Then, the processing proceeds to Step S6. In this case, allowance of an error of α degrees is provided in the measurement of the electrical angle difference of 180 degrees.

In Step S6, the electrical angle existing range judging means 28 judges in which one of eight division ranges obtained by dividing the electrical angle of 360 degrees the first electrical angle f1 exists. Here, the eight division ranges will be described later. On the basis of the judgement result, in Step S7, the offset correction value outputting means 29 operates to add the adjustment value of phase U for the offset correction value of phase U to the offset correction value of phase U to thereby update the offset correction value and to output the resultant value as an offset correction value c1 of phase U, and also operates to add the adjustment value of phase V for the offset correction value of phase V to the offset correction value of phase V to thereby update the offset correction value of phase V and to output the resultant value as an offset correction value c2 of phase V. After outputting the offset correction values c1 and c2, in Step S8, the initialization means 31 initializes the maximum value and the minimum value of the torque command value b and the values of the first and second electrical angles f1 and f2. Then, the processing proceeds to a next speed control processing cycle.

In the speed control processing step SV, all the processings except the processings in the automatic offset correction value adjusting apparatus 4 shown in FIG. 1 are executed. The offset correction value c1 of phase U output from the offset correction value outputting means 29 is subtracted from a detected current d1 of phase U including an offset value output from the current detector 5 thereby to obtain a corrected feedback current g1 of phase U. Likewise, the offset correction value c2 of phase V output from the offset correction value outputting means 29 is subtracted from a detected current d2 of phase V including an offset value output from the current detector 11 thereby to obtain a corrected feedback current g2 of phase V.

The adjustment values for the offset correction values are determined in the following manner.

First, it is assumed that an offset correction error of phase U is dIu, and an offset correction error of phase V is dIv. Then, dIu and dIv are respectively defined by expressions 1 and 2.

$$dIu = \text{(offset correction value } c1 \text{ of phase } U) \quad (1)$$
$$- \text{(actual offset value of phase } U)$$

$$dIv = \text{(offset correction value } c2 \text{ of phase } V) \quad (2)$$
$$- \text{(actual offset value of phase } V)$$

In accordance with the division range in one period of the electrical angle, i.e., 360 degrees in which the first electrical angle f1 exists, the signs of plus and minus of dIu and dIv and the magnitude relation between the absolute values of dIu and dIv are determined. FIG. 4A shows the signs of plus and minus of dIu and dIv and the magnitude relation between the absolute values of dIu and dIv at every division range in which the first electrical angle f1 exists. The relationship between the division ranges shown in FIG. 4A, in each of which the first electrical angle f1 exists, and the offset correction errors dIu and dIv is as follows.

When the first electrical angle f1 is equal to or larger than the electrical angle of 0 degree but smaller than the electrical angle of 60 degrees (R1 in FIG. 4A), $$dIu \leq 0, dIv > 0 \text{ and } |dIu| < |dIv|.$$

When the first electrical angle f1 is equal to or larger than the electrical angle of 60 degrees but smaller than the electrical angle of 120 degrees (R2 in FIG. 4A), $$dIu < 0, dIv > 0 \text{ and } |dIu| \geq |dIv|.$$

When the first electrical angle f1 is equal to or larger than the electrical angle of 120 degrees but smaller than the electrical angle of 150 degrees (R3 in FIG. 4A), $$dIu < 0, dIv \leq 0 \text{ and } |dIu| > |dIv|.$$

When the first electrical angle f1 is equal to or larger than the electrical angle of 150 degrees but smaller than the electrical angle of 180 degrees (R4 in FIG. 4A), $$dIu < 0, dIv < 0 \text{ and } |dIu| \leq |dIv|.$$

When the first electrical angle f1 is equal to or larger than the electrical angle of 180 degrees but smaller than the electrical angle of 240 degrees (R5 in FIG. 4A), $$dIu \geq 0, dIv < 0 \text{ and } |dIu| < |dIv|.$$

When the first electrical angle f1 is equal to or larger than the electrical angle of 240 degrees but smaller than the electrical angle of 300 degrees (R6 in FIG. 4A), $$dIu > dIv < 0 \text{ and } |dIu| \geq |dIv|.$$

When the first electrical angle f1 is equal to or larger than the electrical angle of 300 degrees but smaller than the electrical angle of 330 degrees (R7 in FIG. 4A), ti $dIu > 0, dIv \geq 0$ and $|dIu| > |dIv|$.

When the first electrical angle f1 is equal to or larger than the electrical angle of 330 degrees but smaller than the electrical angle of 360 degrees (R8 in FIG. 4A), $$dIu > 0, dIv > 0 \text{ and } |dIu| \leq |dIv|.$$

In accordance with the above-mentioned relationships, the adjustment values for the offset correction values are determined. As an example, when the first electrical angle f1 exists in the division range R1 shown in FIG. 4A, the offset correction error dIu of phase U becomes zero or a negative value, and thus from the expression (1), the offset correction value of phase U is equal to or smaller than the actual offset value of phase U, so that the offset correction value c1 of phase U can be obtained by increasing the present value by a predetermined quantity. Conversely, the offset correction error dIv of phase V becomes a positive value, and thus from the expression (2), the offset correction value of phase V is larger than the actual offset value of phase V, so that the offset correction value c2 of phase V can be obtained by decreasing the present value by a predetermined quantity. An increase and decrease of the offset correction values are performed by making an increase and decrease in output digital values of the current detectors 5 and 11 by a digital value 1·n level (1·n bits) and a digital value 2·n level (2·n bits) (n =1, 2, 3, . . . (integral numbers)).

Values of a weight when increasing or decreasing the offset correction values are determined on the basis of the magnitude relation between the absolute values of the offset correction errors. In the case of R1, since the relationship of $|dIu| < |dIv|$ is established, the offset correction value of phase V is decreased by decreasing the output digital value of the current detector 11 by a digital value 2·n level (2·n bits), and the offset correction value of phase U is increased by increasing the output digital value of the current detector 5 by a digital value 1 n level (1·n bits). The adjustment values with respect to the individual division ranges of FIG. 4A, which were obtained when n=1, are shown in FIG. 4B.

Embodiment 2

Next, a second embodiment of the present invention will hereinbelow be described.

Figures 5A, 5B:
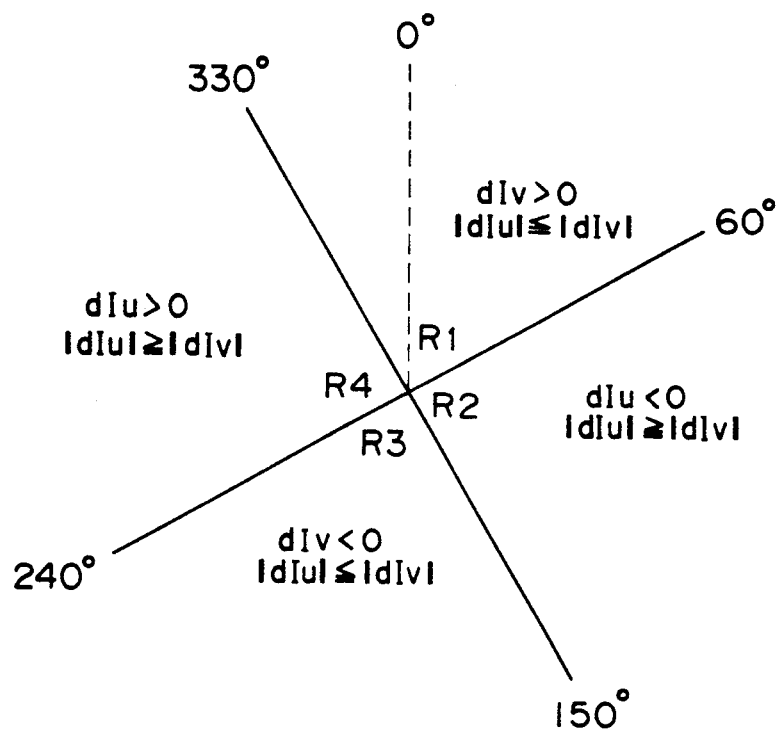
FIGS. 5A and 5B are respectively a diagram showing the values of an electrical angle fl, the signs of plus and minus of offset correction errors dIu and dIv and the magnitude relation therebetween in the second and third embodiments of the present invention, and a diagram showing adjustment values for an offset correction value cl of phase U and an offset correction value c2 of phase V in the second and third embodiment of the present invention.

The structure of the second embodiment is the same as that of the first embodiment except that the area, in which the existence of the first electrical angle f1 was judged in Step S6 of FIG. 3 of the first embodiment, is divided into four ranges. That is, in this embodiment, the electrical angle of 360 degrees is divided into four division ranges. FIG. 5A shows the signs of plus and minus of the offset correction error dIu of phase U and the offset correction error dIv of phase V and the magnitude relation between the absolute values of dIu and dIv for every division range in which the electrical angle f1 exists. The relationship between the offset correction errors dIu and dIv for each division range, in which the electrical angle f1 exists, is as follows.

When the first electrical angle f1 is in the division range including the angular range which is equal to or larger than the electrical angle of 330 degrees but smaller than the electrical angle of 360 degrees and the angular range which is equal to or larger than the electrical angle of 0 degree but smaller than the electrical angle of −60 degrees (R1 in FIG. 5A), $|dIu| \leq |dIv|$ and $dIu > 0$.

When the first electrical angle f1 is equal to or larger than the electrical angle of 60 degrees but smaller than the electrical angle of 150 degrees (R2 in FIG. 5A), $|dIu| \geq |dIv|$ and $dIu < 0$.

When the first electrical angle f1 is equal to or larger than the electrical angle of 150 degrees but smaller than the electrical angle of 240 degrees (R3 in FIG. 5A), $|dIu| \leq |dIv|$ and $dIu < 0$.

When the first electrical angle f1 is equal to or larger than the electrical angle of 240 degrees but smaller than the electrical angle of 330 degrees (R4 in FIG. 5A), $|dIu| \geq |dIv|$ and $dIu > 0$.

In accordance with the above-mentioned relationships, the adjustment values for the offset correction values are determined. As an example, assuming that the first electrical angle f1 exists in the division range R1 in FIG. 5A, since the relationship of $|dIu| \leq |dIv|$ is established as shown in FIG. 5A, and the offset correction error dIv of phase V is a positive value, the offset correction value c2 of phase V is decreased from the present value. An increase and decrease of the offset correction values are performed by making an increase and decrease in the output digital values of the current detector 11 by a digital value 1.n level (1 n bits) (n represents integral numbers). The adjustment values for the offset correction values, which are obtained with respect to the individual division ranges R1 to R4 shown in FIG. 5A when n=1, are shown in FIG. 5B.

Therefore, according to the first and second embodiments of the present invention, in the case where errors occur in the offset correction values due to a temperature change and the like while the servo motor is in operation, in the electrical angle detecting means 26, a ripple of the torque of the servo motor 10 is detected based on the torque command value b, and the first electrical angle f1 where the torque command value becomes maximum due to the ripple component and the second electrical angle f2 where the torque command value becomes minimum due to the ripple component are detected based on the electrical angle signal f. Then, the judgement means 27 judges whether or note offset correction errors have occurred based on a difference between the first and second electrical angles f1 and f2. Then, if it is judged that offset correction errors have occurred, in the correction means 30, the adjustment values for the offset correction values corresponding to the first electrical angle f1 are added to the respective offset correction values. Accordingly, even in the case where, in the digital controller for the servo motor, the offset correction errors have occurred in the offset correction values due to a temperature rise in the elements in the current detectors when the servo motor operates for a long period of time, and a ripple having the same period as that of the electrical angle has been generated in the torque of the servo motor, the occurrence of the offset correction errors is sensed based on the ripple of the torque command value b, and, as a result, it is possible to automatically correct the offset correction values.

Embodiment 3

Next, a third embodiment of the present invention will hereinbelow be described.

Figure 6:
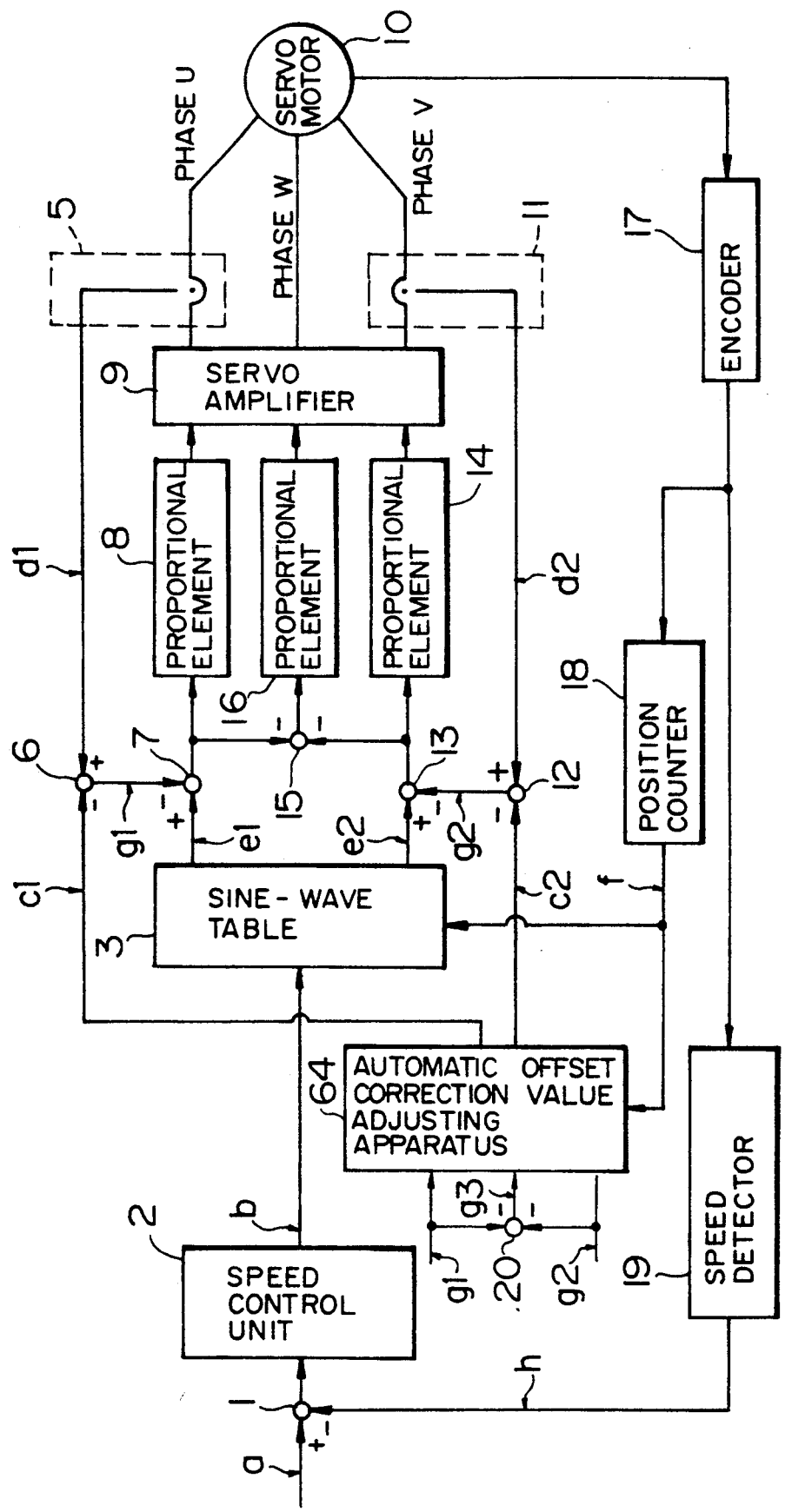
FIG. 6 is a block diagram showing a digital controller for a servo motor having an apparatus for automatically adjusting offset correction values for current detectors of a third embodiment of the present invention.

FIG. 6 is a block diagram showing a digital controller for a servo motor having an automatic offset correction value adjusting apparatus for current detectors of a third embodiment of the present invention. In this third embodiment, the automatic offset correction value adjusting apparatus 4 shown in FIG. 1 is replaced by an automatic offset correction value adjusting apparatus 64, and the connection between the unit blocks and the input/output relation between the unit blocks are partially different from those of the first embodiment shown in FIG. 1. With respect to the description of the connection between the unit blocks and the input/output relation between the unit blocks, a portion thereof common to that of the first embodiment shown in FIG. 1 will be omitted here for the sake of simplification, and only a portion thereof different from that of the first embodiment shown in FIG. 1 will hereinbelow be described.

In FIG. 6, the speed control unit 2 is not connected with the automatic offset correction value adjusting apparatus 64, as is different from the structure shown in FIG. 1. The adder 6 is connected to both the automatic offset correction value adjusting apparatus 64 and the adder 7, so that a feedback current value g1 of phase U output from the adder 6 is input to both the automatic offset correction value adjusting apparatus 64 and the adder 7. The adder 12 is connected to both the automatic offset correction value adjusting apparatus 64 and the adder 13, so that a feedback current value g2 of phase V output from the adder 12 is input to both the automatic offset correction value adjusting apparatus 64 and the adder 13. In addition, both the adders 6 and 12 are connected to the automatic offset correction value adjusting apparatus 64 through an adder 20 in which a feedback current value g3 of phase W is calculated and input to the automatic offset correction value adjusting apparatus 64.

Figure 7:
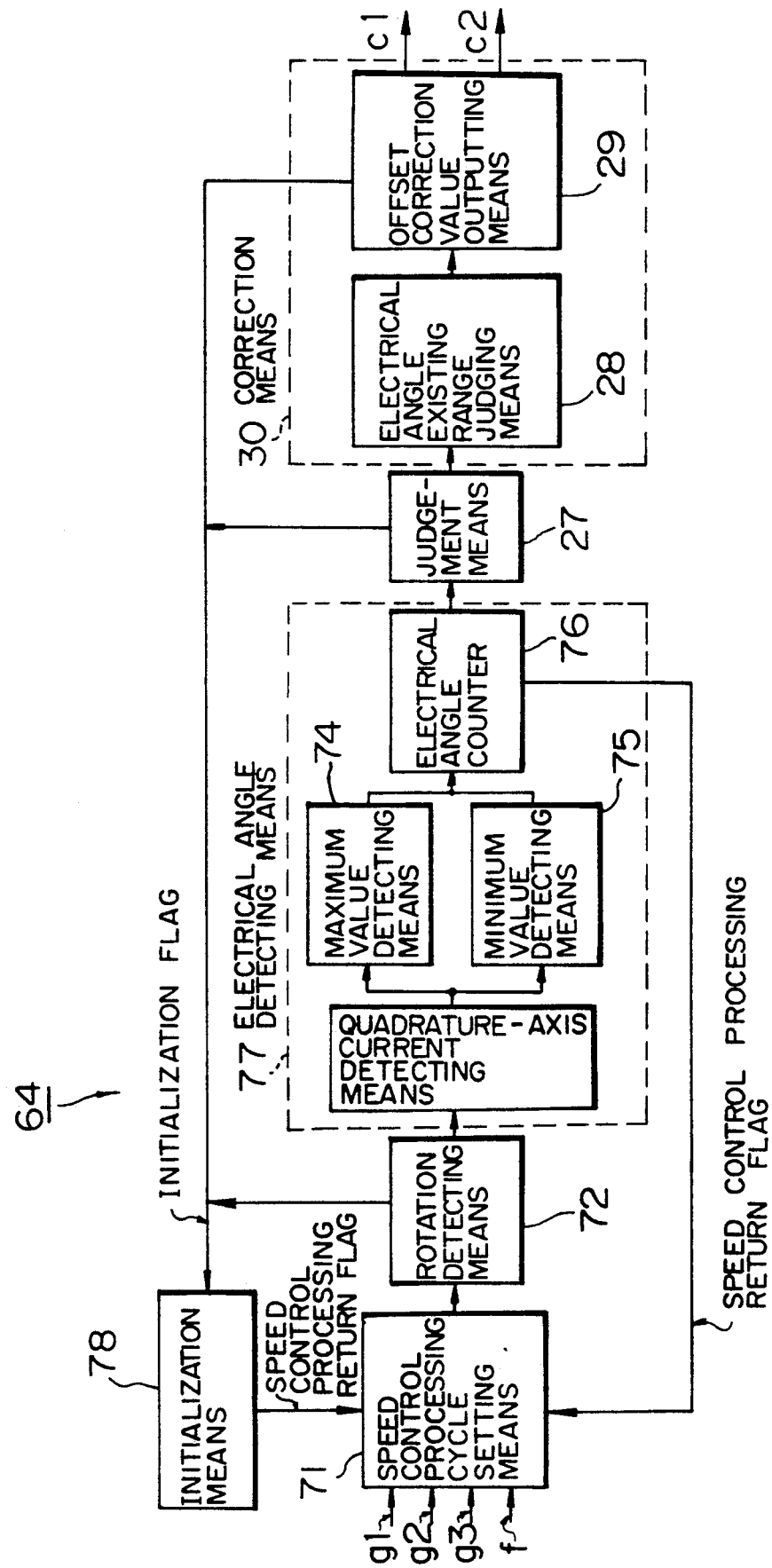
FIG. 7 is a block diagram showing an internal structure of the apparatus for automatically adjusting offset correction values shown in FIG. 6.

FIG. 7 is a block diagram showing an internal structure of the automatic offset correction value adjusting apparatus 64 shown in FIG. 6. In FIG. 7, means 71 for setting a speed control processing cycle receives the three phase feedback current values g1, g2 and g3 and an electrical angle signal f for the servo motor 10 as its input, and passes the three phase feedback current values g1, g2 and g3 and the electrical angle signal f therethrough and also sets a speed control processing cycle on the basis of a speed control processing return flag so that the processing proceeds to a next speed control processing cycle. Means 72 for detecting rotation of the servo motor 10, to which the speed control processing cycle setting mean 71 is connected, receives the electrical angle signal f as its input, and detects that the rotational direction is the same as that in the last speed control processing cycle and the rotational speed is equal to or lower than a predetermined upper limit set value so that a difference in phase between the torque of the servo motor 10 and a quadrature-axis current value does not raise a problem. Means 77 for detecting an electrical angle, to which the rotation detecting means 72 is connected, is constituted by means 73 for detecting a quadrature-axis current value, means 74 for detecting a maximum value, means 75 for detecting a minimum value and an electrical angle counter 76, and this electrical angle detecting means 77 operates at the time of detection by the rotation detecting means 72. The quadrature-axis current detecting means 73 receives the three phase feedback current values g1, g2 and g3 and the electrical angle signal f for the servo motor 10 as its input, and subjects the three phase feedback current values of the servo motor 10 to three phase/two phase conversion to detect a quadrature-axis current value which has the same phase relation with the torque of the servo motor 10. The quadrature-axis current detecting means 73 is connected to both the maximum value detecting means 74 and the minimum value detecting means 75. The maximum value detecting means 74 receives both the quadratureaxis current value and the electrical angle signal f as its input, and stores an electrical angle as a first electrical angle f1 when the quadrature-axis current value is maximum. The minimum value detecting means 75 stores an electrical angle as a second electrical angle f2 when the quadrature-axis current value is minimum. The electrical angle counter 76, to which both the maximum value detecting means 74 and the minimum value detecting means 75 are connected, counts the electrical angle signal f and outputs a speed control processing return flag to the speed control processing cycle setting means 71, if the lapse of one period of the electrical angle is not detected. A judgement means 27, to which the electrical angle detecting means 77 is connected, judges whether or not a difference between the first and second electrical angles f1 and f2 detected by the electrical angle detecting means 77 is 180 degrees. An electrical angle existing range judging means 28, to which the judgement means 27 is connected, judges, when the judgement means 27 judges that a difference between the first and second electrical angles f1 and f2 is 180 degrees, in which one of eight division ranges obtained by dividing the electrical angle of 360 degrees the first electrical angle f1 exists. An offset correction value outputting means 29, to which the electrical angle existing range judging means 28 is connected, has adjustment values for the offset correction values which were set in accordance with the eight division ranges, and operates to add the adjustment values for the offset correction values corresponding to the division ranges, in which the first electrical angle f1 exists, to the offset correction values, respectively, to thereby update the offset correction values and to output the resultant values as the offset correction values c1 and c2. The electrical angle existing range judging means 28 and the offset correction value outputting means 29 constitute a correction means 30 so that offset correction values for the current detectors 5 and 11 shown in FIG. 6 are corrected in accordance with the first electrical angle f1.

Further, initialization means 78, to which the rotation detecting means 72, the judgement means 27 and the offset correction value outputting means 29 are connected, initializes the maximum value and the minimum value of the quadrature-axis current value and the values of the first and second electrical angles f1 and f2 on the basis of an initialization flag output from one of the rotation detecting means 72, the judgement means 27 and the offset correction value outputting means 29, and then outputs a speed control processing return flag to the speed control processing cycle setting means 71. Besides, at the time of performing initialization of the processing cycle, setting of initial values of the offset correction values is also performed in the initialization means 78.

In the automatic offset correction value adjusting apparatus 64 having the structure as described above, if correction errors have occurred in the offset correction values of the current detectors 5, 11, a ripple having the same period as that of the electrical angle is generated in the torque of the servo motor 10, and there exist a first electrical angle f1 where the quadrature-axis current value having the same phase relation as the torque of the servo motor 10 becomes maximum and the second electrical angle f2 where the said quadrature-axis current value becomes minimum. In the present embodiment, automatic adjustment of the offset correction values is performed by detecting the first electrical angle f1.

Figure 8:
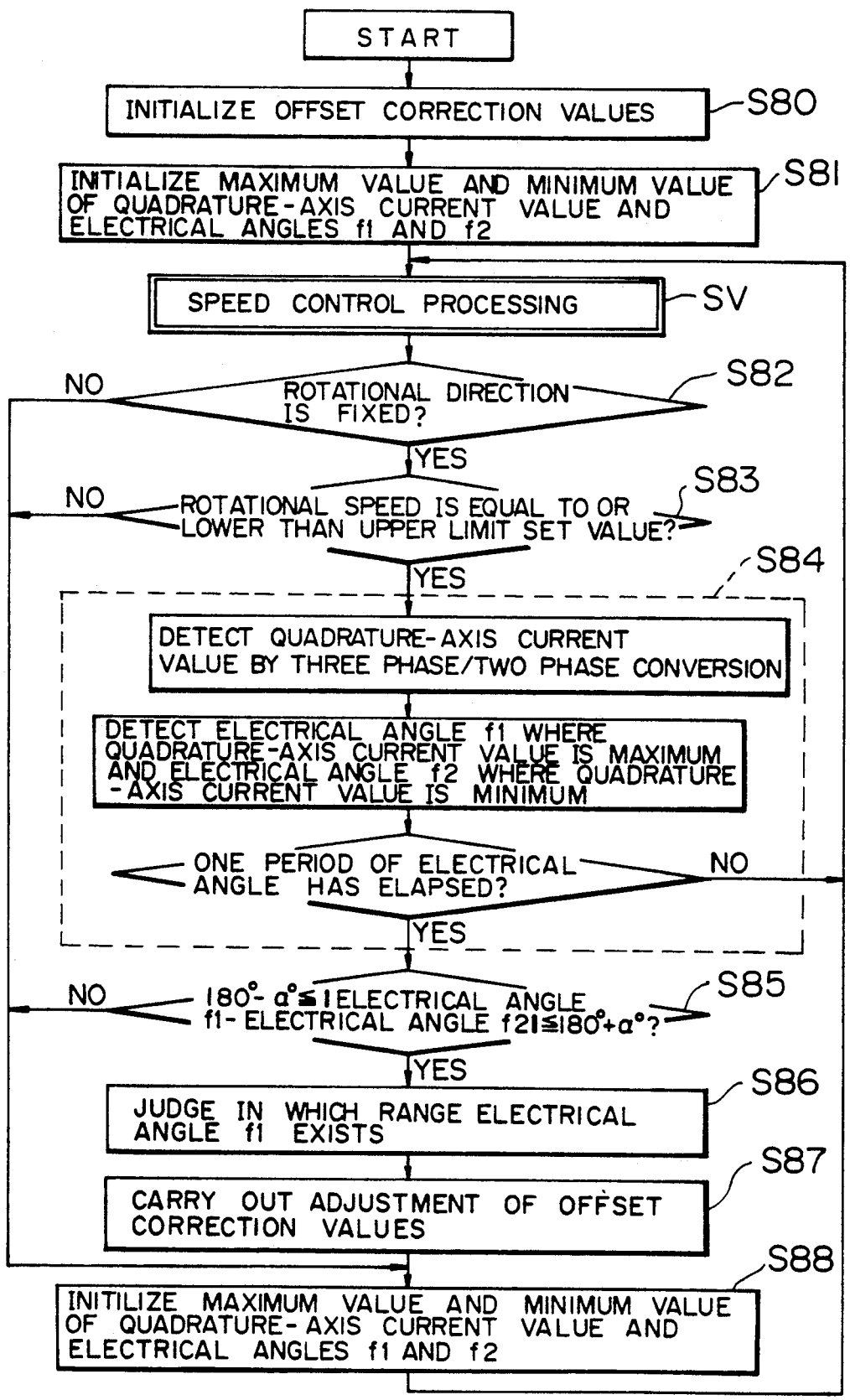
FIG. 8 is a flow chart showing the processing operation performed in the apparatus for automatically adjusting offset correction values shown in FIG. 6.

FIG. 8 is a flow chart showing the processings carried out in the automatic offset correction value adjusting apparatus 64 shown in FIG. 7. Among the steps of the processings, Steps S80 and S81 show processing steps of initialization, and a speed control processing step SV and Steps S80 to S88 show processing steps which are executed in a normal operation of the servo motor 10. As shown in FIG. 8, firstly in Step S80, according to the above-mentioned prior art, the offset correction values, which are determined at the time of turning on a power supply, are set as initial values. Then, in Step S81, the maximum value and the minimum value of the quadrature-axis current value and the values of the first and second electrical angles f1 and f2 are initialized by the initialization means 78.

After a normal operation of the servo motor 10 is started and the speed control processing step SV has been executed, in Step S82, the rotation detecting means 72 detects the present rotational direction of the motor shaft and then compares this rotational direction thus detected with the rotational direction in the last speed control processing cycle. If the rotational direction is changed, the processing proceeds to Step S88, where the maximum value and the minimum value of the quadrature-axis current value and the values of the first and second electrical angles f1 and f2 are initialized by the initialization means 78, and then the processing proceeds to a next speed control processing cycle. On the other hand, if the present rotational direction is the same as that in the last speed control processing cycle, the processing proceeds to Step S83. In Step S83, the present rotational speed is detected by the rotation detecting means 72. Then, if the rotational speed thus detected is equal to or higher than a predetermined upper limit set value, in the same manner as that of Step S82, the processing proceeds to Step S88, and the maximum value and the minimum value of the quadrature-axis current value and the values of the first and second electrical angles f1 and f2 are initialized by the initialization means 78. Then, the processing proceeds to a next speed control processing cycle. On the other hand, if the rotational speed is equal to or lower than the predetermined upper limit set value, the processing proceeds to Step S84. In Step S84, until the time when the electrical angle counter 76 detects the lapse of one period of the electrical angle, the quadrature-axis current value and the electrical angle signal f are input to both the maximum value detecting means 74 and the minimum value detecting means 75 once at every speed control processing cycle, and the value of the electrical angle signal at the time when the quadrature-axis current value measured during one period of the electrical angle becomes maximum is stored as the first electrical angle f1 in the maximum value detecting means 74, and the value of the electrical angle signal at the time when the quadrature-axis current value measured during one period of the electrical angle becomes minimum is stored as the second electrical angle f2 in the minimum value detecting means 75. If the lapse of one period of the electrical angle is not detected, the processing proceeds to a next speed control processing cycle. On the other hand, if the lapse of one period of the electrical angle is detected, the processing proceeds to Step S85. In Step S85, based on the fact that a torque ripple of the servo motor 10 due to correction errors of the offset correction values has the same period as that of the electrical angle, if an absolute value of a difference between the first and second electrical angles f1 and f2 is not 180 degrees, it is judged by the judgement means 27 that a ripple of the torque due to any factor other than correction errors of the offset correction values has been generated. Then, in Step S88, the maximum value and the minimum value of the quadrature-axis current value and the values of the first and second electrical angles f1 and f2 are initialized by the initialization means 78, and the processing proceeds to a next speed control processing cycle. On the other hand, if in Step S85, an absolute value of a difference between the first and second electrical angles f1 and f2 is 180 degrees, it is judged by the judgement means 27 that a torque ripple due to correction errors of the offset correction values has been generated. Then, the processing proceeds to Step S86. In this case, allowance of an error of o degrees is provided in the measurement of the electrical angle difference of 180 degrees.

In Step S86, in the same way as described in the first or second embodiment, the electrical angle existing range judging means 28 judges in which one of eight or four division ranges obtained by dividing the electrical angle of 360 degrees the first electrical angle f1 exists. On the basis of the judgement result, in Step S87, the offset correction value outputting means 29 adds the adjustment value of phase U for the offset correction value of phase U to the offset correction value of phase U to update the offset correction value and output the resultant value as an offset correction value c1, and also adds the adjustment value of phase V for the offset correction value of phase V to the offset correction value of phase V to update the offset correction value and output the resultant value as an offset correction value c2. After outputting the offset correction values c1 and c2, in Step S88, the maximum value and the minimum value of the quadrature-axis current value and the values of the first and second electrical angles f1 and f2 are initialized by the initialization means 78. Then, the processing proceeds to a next speed control processing cycle.

In the speed control processing step SV, all the processings except the processings in the automatic offset correction value adjusting apparatus 64 shown in FIG. 6 are executed. The offset correction value c1 of phase U output from the offset correction value outputting means 29 is subtracted from a detected current d1 of phase U including an offset value output from the current detector 5 thereby to obtain a corrected feedback current g1 of phase U. Likewise, the offset correction value c2 of phase V output from the offset correction value outputting means 29 is subtracted from a detected current d2 of phase V including an offset value output from the current detector 11 thereby to obtain a corrected feedback current g2 of phase V.

Incidentally, the adjustment values for the offset correction values are determined in the same way as done in the first and second embodiments.

Embodiment 4

Next, a fourth embodiment of the present invention will hereinbelow be described.

Figure 9:
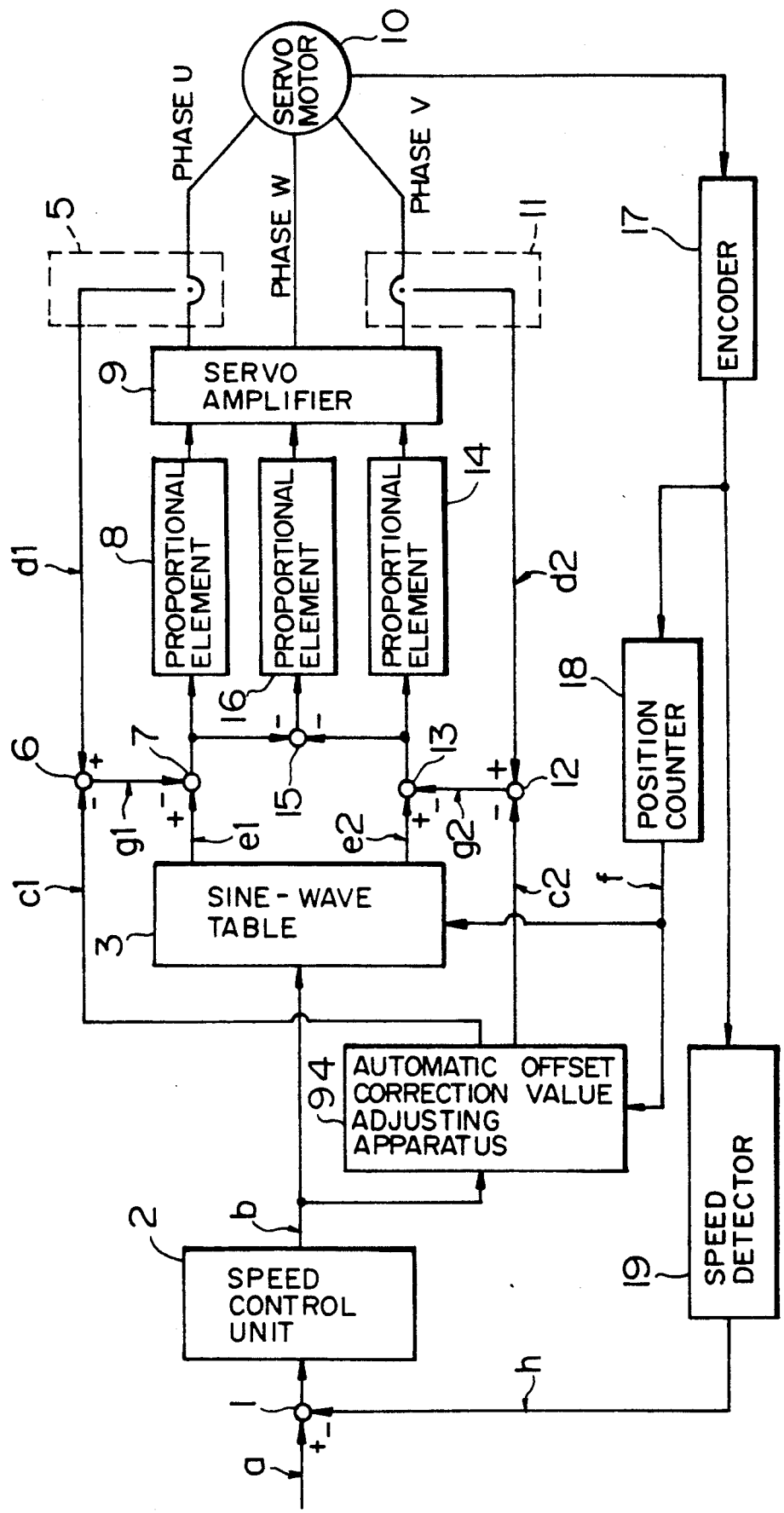
FIG. 9 is a block diagram showing a digital controller for a servo motor having an apparatus for automatically adjusting offset correction values for current detectors of a fourth embodiment of the present invention.

FIG. 9 is a block diagram showing a digital controller for a servo motor having an automatic offset correction value adjusting apparatus for current detectors of a fourth embodiment of the present invention. This embodiment is designed so that the automatic offset correction value adjusting apparatus 4 of FIG. 1 is replaced by an automatic offset correction value adjusting apparatus 94. Since the connection between the unit blocks and the input/output relation between the unit blocks are the same as those in the first embodiment of FIG. 1, a description thereof will be omitted for the sake of simplification.

Figure 10:
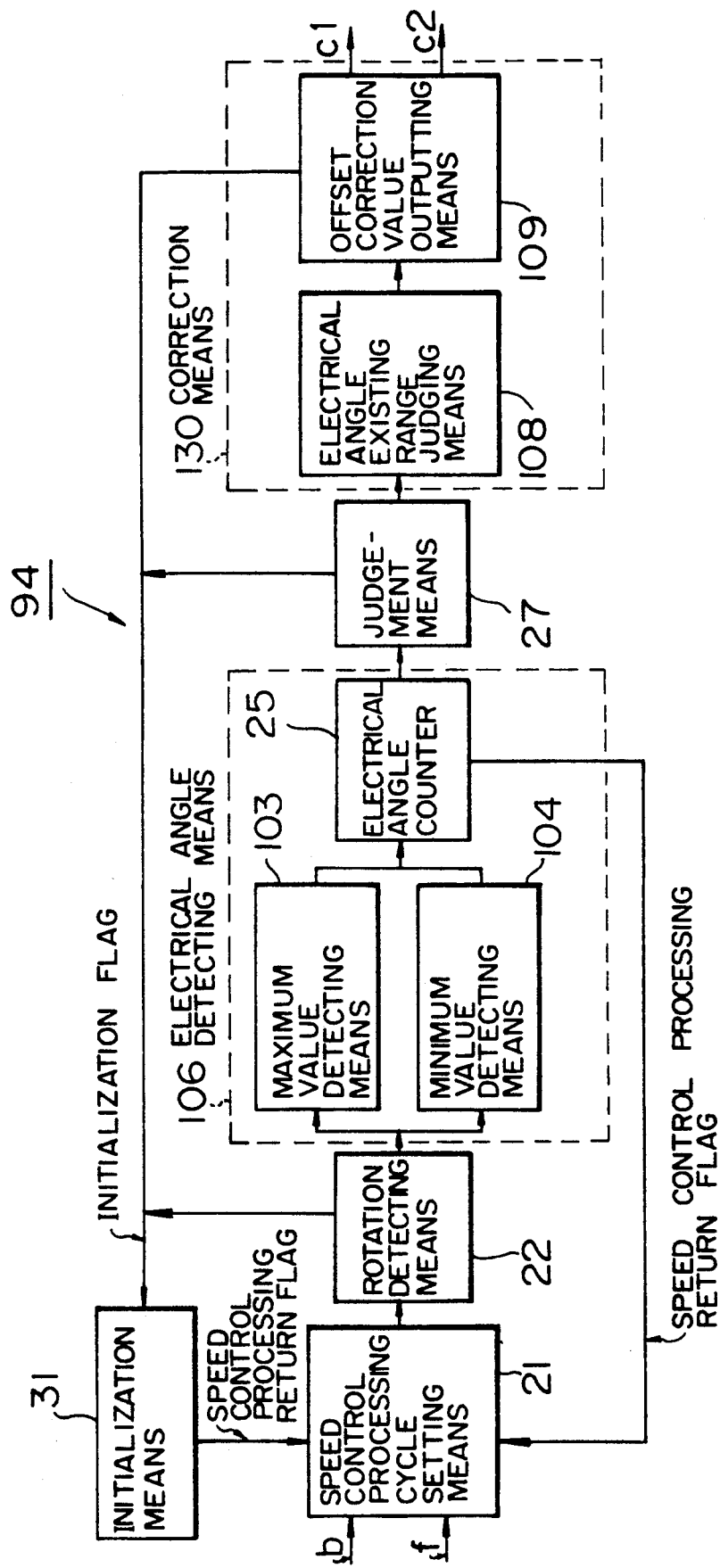
FIG. 10 is a block diagram showing an internal structure of the apparatus for automatically adjusting offset correction values shown in FIG. 9.

FIG. 10 is a block diagram showing an internal structure of the automatic offset correction value adjusting apparatus 94 shown in FIG. 9. In FIG. 10, a speed control processing cycle setting means 21 receives both a torque command value b and an electrical angle signal f of the servo motor 10 as its input, and passes both the torque command value b and the electrical angle signal f therethrough and also sets a speed control processing cycle on the basis of a speed control processing return flag so that the processing proceeds to a next speed control processing cycle. A rotation detecting means 22, to which the speed control processing cycle setting means 21 is connected, receives both the torque command value b and the electrical angle signal f as its input and detects that the rotational direction is the same as that in the last speed control processing cycle and the rotational speed is equal to or lower than a predetermined upper limit set value so that a difference in phase between the torque of the servo motor 10 and the torque command value b does not raise a problem. Means 106 for detecting a torque and an electrical angle, to which the rotation detecting means 22 is connected, receives both the torque command value b and the electrical angle signal f as its input. The torque/electrical angle detecting means 106 is constituted by means 103 for detecting a maximum value which operates to store a torque command value b as a torque maximum value b1 when the torque command value b is maximum and to store an electrical angle as a first electrical angle f1 at that time, means 104 for detecting a minimum value which operates to store a torque command value b as a torque minimum value b2 when the torque command value b is minimum and to store an electrical angle as a second electrical angle f2 at that time, and an electrical angle counter 25 which operates to count an electrical angle signal f and to output a speed control processing return flag to the speed control processing cycle setting means 21, if the lapse of one period of the electrical angle is not detected, and this torque/electrical angle detecting means 106 operates at the time of detection by the rotation detecting means 22. A judgement means 27, to which the torque/electrical angle detecting means 106 is connected, judges whether or not a difference between the first and second electrical angles f1 and f2 detected by the torque/electrical angle detecting means 106 is 180 degrees. Means 108 for judging an electrical angle existing range, to which the judgement means 27 is connected, judges, when the judgement means 27 judges that a difference between the first and second electrical angles f1 and f2 is 180 degrees, in which one of four division ranges obtained by dividing the electrical angle of 360 degrees the first electrical angle f1 exists. Means 109 for outputting offset correction values, to which the electrical angle existing range judging means 108 is connected, has adjustment values for the offset correction values which were set in accordance with the four division ranges and a difference between the torque maximum value b1 and the torque minimum value b2, and operates to add the basic adjustment values for the offset correction values corresponding to the division range, in which the first electrical angle f1 exists, and the difference between the torque maximum value b1 and the torque minimum value b2 to the offset correction values, respectively, to thereby update the offset correction values and to output the resultant values as offset correction values c1 and c2. The electrical angle existing range judging means 108 and the offset correction value outputting means 109 constitute correction means 130, so that offset correction values for the current detectors 5 and 11 shown in FIG. 9 are corrected in accordance with the first electrical angle f1 and a difference between the torque maximum value b1 and the torque minimum value b2.

Further, initialization means 31, to which the rotation detecting means 22, the judgement means 27 and the offset correction value outputting means 109 are connected, initializes the torque maximum value b1, the torque minimum value b2 and the values of the first and second electrical angles f1 and f2 on the basis of an initialization flag output from one of the rotation detecting means 22, the judgement means 27 and the offset correction value outputting means 109, and then outputs a speed control processing return flag to the speed control processing cycle setting means 21. Besides, at the time of performing initialization of the processing cycle, setting of initial values of the offset correction values is also performed in the initialization means 31.

In the automatic offset correction value adjusting apparatus 94 having the structure as described above, if correction errors have occurred in the offset correction values of the current detectors 5, 11, a ripple having the same period as that of the electrical angle is generated in the torque of the servo motor 10, and there exist a maximum value b1 of the torque command value b, a first electrical angle f1 where the torque command value b becomes maximum, a minimum value b2 of the torque command value b, and a second electrical angle f2 where the torque command value b becomes minimum. In the present embodiment, automatic adjustment of the offset correction values is performed by detecting the first electrical angle f1 and the difference between the torque maximum value b1 and the torque minimum value b2.

Figure 11:
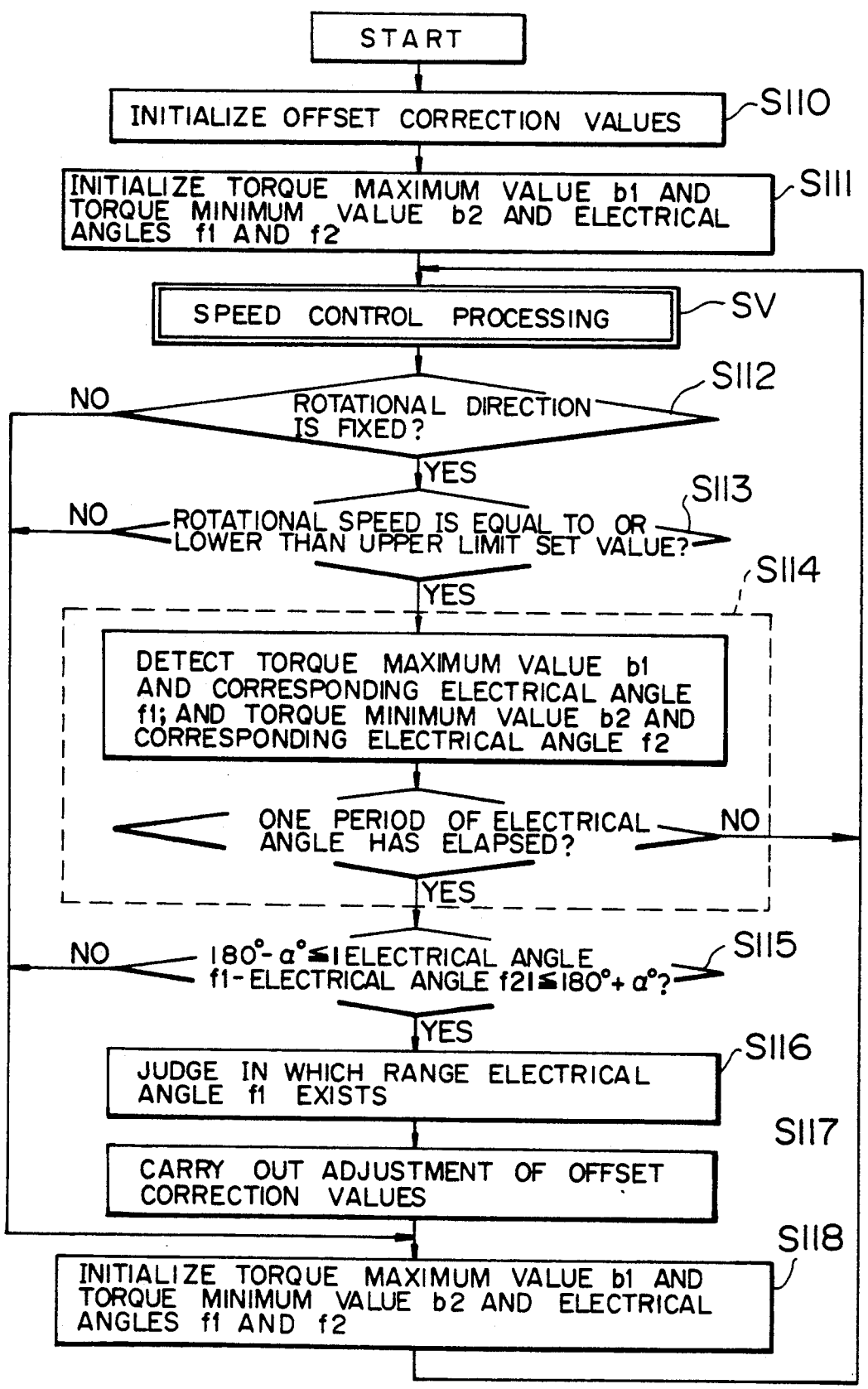
FIG. 11 is a flow chart showing the processing operation performed in the apparatus for automatically adjusting offset correction values shown in FIG. 9.

FIG. 11 is a flow chart showing the processings performed in the automatic offset correction value adjusting apparatus 94 shown in FIG. 10. Among the steps of the processings, Steps S110 and S111 show processing steps of initialization, and a speed control processing step SV and Steps S112 to S118 show processing steps which are executed in a normal operation of the servo motor 10. As shown in FIG. 11, firstly in Step S110, according to the above-mentioned prior art, the offset correction values, which are determined at the time of turning on a power supply, are set as initial values. Then, in Step S111, the maximum value B1 and the minimum value b2 of the torque command value b and the values of the first and second electrical angles f1 and f2 are initialized by the initialization means 31.

After a normal operation of the servo motor 10 is started and the speed control processing step SV has been executed, in Step S112, the rotational detecting means 22 detects the present rotation direction of the motor shaft and then compares this rotational direction thus detected with the rotational direction in the last speed control processing cycle. If the rotational direction is changed, the processing proceeds to Step S118, where the maximum value b1 and the minimum value b2 of the torque command value b, and the fist and second electrical angles f1 and f2 are initialized by the initialization means 31. Then, the processing proceeds to a next speed control processing cycle. On the other hand, if the present rotational direction is the same as that in the last speed control processing cycle, the processing proceeds to Step S113. In Step S113, the present rotational speed is detected by the rotation detecting means 22. Then, if the present rotational speed thus detected is equal to or higher than a predetermined upper limit set value, in the same manner as that of Step S112, the processing proceeds to Step S118, and the maximum value b1 and the minimum value b2 of the torque command value b and the values of the first and second electrical angles f1 and f2 are initialized by the initialization means 31, and then the processing proceeds to a next speed control processing cycle. On the other hand, if the rotational speed is equal to or lower than the predetermined upper limit set value, the processing proceeds to Step S114. In Step S114, until the time when the electrical angle counter 25 detects the lapse of one period o the electrical angle, both the torque command value b and the electrical angle f are input to the torque/electrical angle detecting means 106 once at every speed control processing cycle, and a maximum value of the torque command value b measured during one period of the electrical angle by the maximum value detecting means 103 is stored as a torque maximum value b1 and the value of the electrical angle signal at the time when the torque maximum value b1 has been obtained is stored as a first electrical angle f1 in the maximum value detecting means 103, respectively. On the other hand, a minimum value of the torque command value b measured during one period of the electrical angle by the minimum value detecting means 104 is stored as a torque minimum value b2 and the value of the electrical angle signal at the time when the torque minimum value b2 ah been obtained is stored as a second electrical angle f2 in the minimum value detecting means 104, respectively. If the lapse of one period of the electrical angle is not detected, the processing proceeds to a next speed control processing cycle. On the other hand, if the lapse of one period of the electrical angle is detected, the processing proceeds to Step S115. In Step S115, if an absolute value of a difference between the first and second electrical angles f1 and f2 is not 180 degrees, it is judged b the judgement means 27 that a ripple of the torque due to any factor other than offset correction errors has been generated. Then, the processing proceeds to Step S118. In Step S118, the maximum value b1 and the minimum value b2 of the torque command value b and the values of the first and second electrical angles f1 and f2 are initialized by the initialization means 31, and the processing proceeds to a next speed control processing cycle. On the other hand, if it is decided in Step S115 that the absolute value of a difference between the first and second electrical angles f1 and f2 is 180 degrees, it is judged by the judgement means 27 that a torque ripple due to offset correction errors has been generated. Then, the processing proceeds to Step S116. In this case, allowance of an error of o degrees is provided in the measurement of the electrical angle difference of 180 degrees.

In Step S116, the electrical angle existing range judging means 108 judges in which one of four division ranges obtained by dividing the electrical angle of 360 degrees the first electrical angle f1 exists, and then the processing proceeds to Step S117. Here, the four division ranges will be described later. Then, on the basis of the judgement result in Step S116 and a difference between the torque maximum value b1 and the torque minimum value b2, the offset correction value outputting means 109 operates to add the adjustment value of phase U for the offset correction value of phase U to the offset correction value of phase U to thereby update the offset correction value and to output the resultant value as an offset correction value c1 of phase U, and also operates to add the adjustment value of phase V for the offset correction value of phase V to the offset correction value of phase V to thereby update the offset correction value of phase V and to output the resultant value as an offset correction value c2 of phase V. Here, the adjustment values for the offset correction values will be described later. After outputting the offset correction values c1 and c2, in Step S118, the maximum value b1 and the minimum value b2 of the torque command value b and the values of the first and second electrical angles f1 and f2 are initialized by the initialization means 31, and then the processing proceeds to a next speed control processing cycle.

In the speed control processing step SV, all the processings except the processings in the automatic offset correction value adjusting apparatus 94 shown in FIG. 9 are executed. The offset correction value c1 of phase U output from the offset correction value outputting means 109 is subtracted from a detected current d1 of phase U including an offset value output from the current detector 5 thereby to obtain a corrected feedback current g1 of phase U. Likewise, the offset correction value c2 of phase V output from the offset correction value outputting means 109 is subtracted from a detected current d2 of phase V including an offset value output from the current detector 11 thereby to obtain a corrected feedback current g2 of phase V.

Incidentally, the adjustment values for the offset correction values are determined in the following manner.

Figures 12A, 12B:
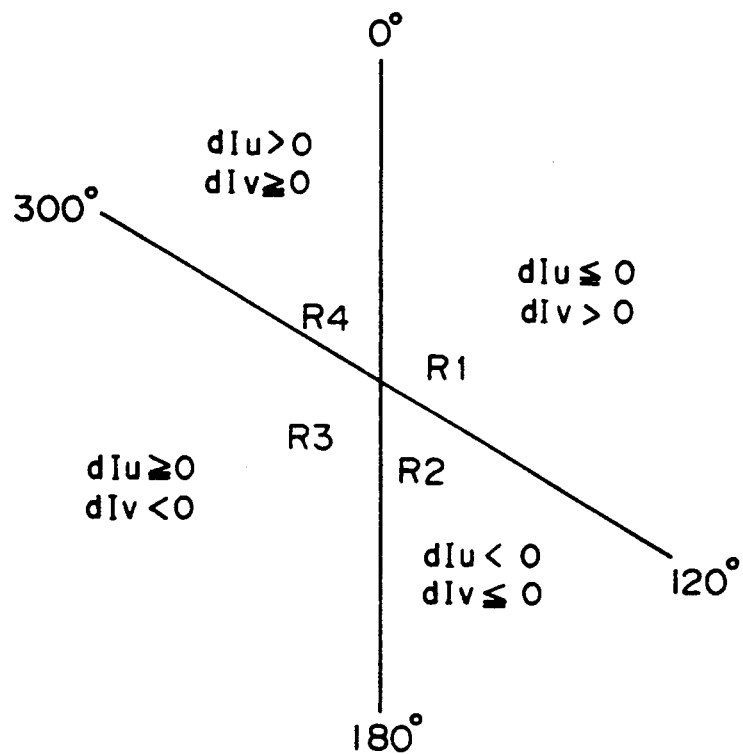
FIGS. 12A and 12B are respectively a diagram showing the values of an electrical angle f1 and the signs of plus and minus of offset correction errors dIu and dIv in the fourth embodiment of the present invention, and a diagram showing adjustment values for the offset correction value c1 of phase U and the offset correction value c2 of phase V in the fourth embodiment of the present invention.

In accordance with a division range among the four division ranges obtained by dividing a electrical angle of 360 degrees for one period, in which division range the first electrical angle f1 exists, the signs of plus and minus of the offset correction error dIu represented by the expression (1) and the offset correction error dIv represented by the expression (2) are determined. Then, the signs of plus and minus of dIu and dIv corresponding to respective division ranges, in which the first electrical angle f1 exists, are shown in FIG. 12A. From FIG. 12A, the relationship between the offset correction errors dIu and dIv corresponding to respective division ranges, in which the first electrical angle f1 exists, is as follows.

When the first electrical angle f1 is equal to or larger than the electrical angle of 0 degree but smaller than the electrical angle of 120 degrees (R1 in FIG. 12A), $$dIu \leq 0 \text{ and } dIv > 0.$$

When the first electrical angle f1 is equal to or larger than the electrical angle of 120 degrees but smaller than the electrical angle of 180 degrees (R2 in FIG. 12A), $$dIu \leq 0 \text{ and } dIv > 0.$$

When the first electrical angle f1 is equal to or larger than the electrical angle of 180 degrees but smaller than the electrical angle of 300 degrees (R3 in FIG. 12A), $$dIu < 0 \text{ and } dIv \leq 0.$$

When the first electrical angle f1 is equal to or larger than the electrical angle of 10 degrees but smaller than the electrical angle of 300 degrees (R3 in FIG. 12A).

$$dIu \geq 0 \text{ and } dIv < 0.$$

When the first electrical angle f1 is equal to or larger than the electrical angle 300 degrees but smaller than an electrical angle 360 degrees (R4 in FIG. 12A), $$dIu > 0 \text{ and } dIv \geq 0.$$

A ripple of the torque $\tau$ of the servo motor 10 due to occurrence of the offset correction errors dIu and dIv is given by the following expressions 3, 4 and 5 using the electrical angle $\theta$.

$$\tau = \tau \text{off} \cdot \sin(\theta + \theta \text{off}) \tag{3}$$

$$\tau \text{off} = M \cdot \Delta T = \sqrt{3} \, Kt \, \{dIu^2 + dIv^2 + dIu \cdot dIv\}^{\frac{1}{2}} \tag{4}$$

$$\theta \text{off} = \tan^{-1} \frac{(dIu + 2dIv)}{-\sqrt{3} \, dIu} \tag{5}$$

where M is a conversion coefficient between the torque of the servo motor 10 and the torque command value, $\Delta T$ is a torque amplitude value represented by a difference between the torque maximum value b1 and the torque minimum value b2, and Kt is a torque constant.

The above expressions 4 and 5 are respectively transformed into expressions 6 and 7 which define p1 and p2, respectively.

$$\left(\frac{M \cdot \Delta T}{\sqrt{3} \, Kt}\right)^2 = dIu^2 + dIv^2 + dIu \cdot dIv = P1 \quad (6)$$

$$\tan \theta_{off} = \frac{(dIu + 2dIv)}{-\sqrt{3} \, dIu} = p2 \quad (7)$$

$\theta_{off}$ can be represented by an expression 8 using the first electrical angle f1.

$$\theta_{off} = 9020 - (\text{first electrical angle f1}) \quad (8)$$

Based on the expressions 6, 7 and 8, the absolute values of the offset correction errors dIu and dIv are represented by expressions 9 and 10 by using p1 and p2.

$$|dIu| = 2\left(\frac{p1}{3(1 + p2^2)}\right)^{\frac{1}{2}} \quad (9)$$

$$|dIv| = \frac{1 + \sqrt{3} \, p2}{2} |dIu| \quad (10)$$

Now, assuming that one level of the digital value of the output of each of the current detectors 5 and 11 corresponds to g amperes, the magnitude Ku of the adjustment value for the offset correction value of phase U and the magnitude Kv of the adjustment value for the offset correction value of phase V are represented by expressions 11 and 12, respectively.

$$Ku = \text{int}\left(\frac{|dIu|}{q}\right) \quad (11)$$

$$Kv = \text{int}\left(\frac{|dIv|}{q}\right) \quad (12)$$

where int [A] represents an integral number of A.

From FIG. 12A and the expression 11 and 12, the adjustment values for the offset correction values are obtained. As an example, when the first electrical angle f1 exists in the division rang R1 shown in FIG. 12A, since the offset correction error dIu of phase U is zero or has a negative value, the expression 1 shows that the offset correction value c1 of phase U is equal to or smaller than the actual offset value of phase U, and thus the value Ku obtained from the expression 11 is added to the present value of the offset correction value c1 of phase U thereby to correct the offset correction value c1 of phase U. On the other hand, since dIv has a positive value, the expression 2 shows that the offset correction value c2 of phase V is larger than the actual offset value of phase V, and thus the value Kv obtained from the expression 12 is subtracted from the present value of the offset correction value c2 of phase V thereby to correct the offset correction value c2 of phase V. The adjustment values for the offset correction values, which correspond to the respective division ranges shown in FIG. 12A and are represented by using Ku and Kv, are shown in FIG. 12B. Further, in the present embodiment, the absolute values of the offset correction errors dIu and dIv, which are obtained from the expressions 9 and 10, respectively, are used in the calculation of the expressions 11 and 12, and the resultant values of the calculation are added to the respective offset correction values thereby to perform the correction. However, alternatively, the values obtained by dividing the absolute values of the offset correction errors dIu and dIv obtained from the expressions 9 and 10 by a positive integral number n may be used in the calculation of the expressions 11 and 12, and the resultant values of the calculation are added to the respective offset correction values thereby to perform the correction.

Thus, in the above-mentioned embodiment, in the case where correction errors have occurred in the offset correction values due to a temperature change and the like while the servo motor is in operation, the torque/electrical angle detecting means 106 detects, on the basis of the torque command value b and the electrical angle signal f of the servo motor, the torque maximum value b1 as a value of the torque command value b when it has become maximum, the first electrical angle f1 when the torque maximum value b1 has been obtained, the torque minimum value b2 as a value of the torque command value b when it has become minimum, and the second electrical angle f2 when the torque minimum value b2 has been obtained, and the judgement means 27 judges whether or not offset correction errors have occurred. Then, if it is judged by the judgement means 27 that the offset correction errors have occurred, the correction means 130 adds adjustment values for the offset correction values, which correspond to the value of the first electrical angle f1 and a difference between the torque maximum value b1 and the torque minimum value b2, to the respective offset correction values to thereby update the offset correction values. As a result, even in the case where, in the digital controller for the servo motor, correction errors should occur in the respective offset correction values due to a temperature rise of the elements in the current detectors after the servo motor has operated for a long period of time, so that a ripple having the same period as that of the electrical angle is generated in the torque of the servo motor, occurrence of offset correction errors is sensed on the basis of a ripple of the torque command value, whereby it is made possible to automatically correct offset correction values.

The present invention has been described in detail with respect to the preferred embodiments. However, it should be recognized that, in the preferred embodiments, variations of component elements, or various changes thereof which do not depart from the spirit and scope of the present invention, or modifications made by a combination thereof may be effected by one skilled in the art.

As set forth hereinabove, according to the present invention, even if correction errors should occur in offset correction values due to a temperature rise or the like, automatic adjustment of the offset correction values can be performed while the servo motor is in operation, a torque ripple of the servo motor can be reduced, deterioration of control performance such as an increase of a speed ripple can be suppressed, and the operation of the servo motor can be controlled stably and precisely for a long period of time.

I claim:

1. An apparatus for automatically adjusting offset correction values for current detectors of a digital controller for a servo motor employing the current detectors, each having an offset value, comprising:

rotation detecting means for receiving both a torque command value and a electrical angle signal of said servo motor as an input thereto and detecting that, in one period of an electrical angle, said servo motor rotates in one direction and a rotational speed thereof is equal to or lower than a predetermined upper limit set value;

electrical angle detecting mean for detecting, at the time of detection by said rotation detecting means, a first electrical angle where the torque command value is maximum and a second electrical angle where the torque command value is minimum, in the one period of an electrical angle, respectively;

judgement means for judging whether or not a difference between the first and second electrical angles detected by said electrical angle detecting means is 180 degrees; and correction means for correcting, when said judgement means judges that the difference between the first and second electrical angles is 180 degrees, offset correction values for said current detectors in accordance with the first electrical angle.

2. An apparatus for automatically adjusting offset correction values for current detectors of a digital controller for a servo motor employing the current detectors, each having an offset value, comprising:

rotation detecting means for receiving both a three phase feedback a.c. value and an electrical angle signal of said servo motor as an input thereto and detecting that, in one period of an electrical angle, said servo motor rotates in one direction and a rotational speed thereof is equal to or lower than a predetermined upper limit set value;

electrical angle detecting means for detecting, at the time of detection by said rotation detecting means, a first electrical angle where a quadrature-axis current obtained from the three phase feedback a.c. value of said servo motor is maximum and a second electrical angle where the quadrature-axis current is minimum, in the one period of an electrical angle, respectively;

judgement means for judging whether or not a difference between the first and second electrical angles detected by said electrical angle detecting means is 180 degrees; and correction means for correcting, when said judgement means judges that the difference between the first and second electrical angles is 180 degrees, offset correction values for said current detectors in accordance with the first electrical angle.

3. An apparatus according to claim 1, wherein said correction means for correcting the offset correction values for said current detectors comprises:

electrical angle existing range judging means for judging in which one of eight division ranges obtained by dividing an electrical angle of 360 degrees the first electrical angle exists; and offset correction value outputting means having adjustment values for the offset correction values, which are set in accordance with the eight division ranges, and serving to add the adjustment values for the offset correction values corresponding to the division range, in which the first electrical angle exists, to the respective offset correction values to update the offset correction values and to output the resultant values.

4. An apparatus according to claim 2, wherein said correction means for correcting the offset correction values for said current detectors comprises:

electrical angle existing range judging means for judging in which one of eight division ranges obtained by dividing an electrical angle of 360 degrees the first electrical angle exists; and offset correction value outputting means having adjustment values for the offset correction values, which are set in accordance with the eight division ranges, and serving to add the adjustment values for the offset correction values corresponding to the division range, in which the first electrical angle exists, to the respective offset correction values to update the offset correction values and to output the resultant values.

5. An apparatus according to claim 1, wherein said correction means for correcting the offset correction values for said current detectors comprises:

electrical angle existing range judging means for judging in which one of four division ranges obtained by dividing an electrical angle of 360 degrees the first electrical angle exists; and offset correction value outputting means having adjustment values for the offset correction values, which are set in accordance with the four division ranges, and serving to add the adjustment values for the offset correction values corresponding to the division range, in which the first electrical angle exists, to the respective offset correction values to update the offset correction values and to output the resultant values.

6. An apparatus according to claim 2, wherein said correction means for correcting the offset correction values for said current detectors comprises:

electrical angle existing range judging means for judging in which one of four division ranges obtained by dividing an electrical angle of 360 degrees the first electrical angle exists; and offset correction value outputting means having adjustment values for the offset correction values, which are set in accordance with the four division ranges, and serving to add the adjustment values for the offset correction values corresponding to the division range, in which the first electrical angle exists, to the respective offset correction values to update the offset correction values and to output the resultant values.

7. An apparatus for automatically adjusting offset correction values for current detectors of a digital controller for a servo motor employing the current detectors, each having an offset value, comprising:

rotation detecting means for receiving both a torque command value and an electrical angle signal of said servo motor as an input thereto and detecting that, in one period of an electrical angle, said servo motor rotates in one direction and a rotational speed thereof is equal to or lower than a predetermined upper limit set value;

torque/electrical angle detecting means for detecting, at the time of detection by said rotation detecting means, a maximum value of the torque command value, a first electrical angle at the time of obtaining the maximum torque command value, a minimum value of the torque command value, and a second electrical angle at the time of obtaining the minimum torque command value, in the one period of the electrical angle, respectively;

judgement means for judging whether or not a difference between the first and second electrical angles detected by said torque/electrical angle detecting means is 180 degrees; and correction means for correcting, when said judgement means judges that the difference between the first and second electrical angles is 180 degrees, offset correction values for said current detectors in accordance with the first electrical angle and a difference between the maximum torque command value and the minimum torque command value.

8. An apparatus according to claim 5, wherein said correction means for correcting the offset correction values for said current detectors comprises:

electrical angle existing range judging means for judging in which one of four division ranges obtained by dividing an electrical angle of 360 degrees the first electrical angle exists; and offset correction value outputting means having adjustment values for the offset correction values, which are set in accordance with the four division ranges and a difference between the maximum torque command value and the minimum torque command value, and serving to add the adjustment values for the offset correction values corresponding to the division range in which the first electrical angle exists and the difference between the maximum torque command value and the minimum torque command value to the respective offset correction values to update the offset correction value and to output the resultant values.

* * * * *